US012798878B2

(12) United States Patent
Lindbo

(10) Patent No.: US 12,798,878 B2
(45) Date of Patent: Nov. 17, 2026

(54) STORAGE AND RETRIEVAL SYSTEM

(71) Applicant: Ocado Innovation Limited, Hatfield (GB)

(72) Inventor: Lars Sverker Ture Lindbo, Hatfield (GB)

(73) Assignee: Ocado Innovation Limited, Hatfield (GB)

( * ) Notice: Subject to any disclaimer, the term of this patent is extended or adjusted under 35 U.S.C. 154(b) by 304 days.

(21) Appl. No.: 18/565,859

(22) PCT Filed: May 30, 2022

(86) PCT No.: PCT/EP2022/064660
§ 371 (c)(1),
(2) Date: Nov. 30, 2023

(87) PCT Pub. No.: WO2022/253781
PCT Pub. Date: Dec. 8, 2022

(65) Prior Publication Data

US 2024/0262617 A1 Aug. 8, 2024

(30) Foreign Application Priority Data

Jun. 2, 2021 (GB) ..................................... 2107894

(51) Int. Cl.
*B65G 1/04* (2006.01)
*B65G 1/06* (2006.01)

(52) U.S. Cl.
CPC ......... *B65G 1/0464* (2013.01); *B65G 1/0478* (2013.01); *B65G 1/0485* (2013.01); *B65G 1/065* (2013.01)

(58) Field of Classification Search
CPC .. B65G 1/0464; B65G 1/0478; B65G 1/0485; B65G 1/065
See application file for complete search history.

(56) References Cited

U.S. PATENT DOCUMENTS 4,687,403 A 8/1987 Motoda
5,380,138 A 1/1995 Kasai et al.
(Continued)

FOREIGN PATENT DOCUMENTS

CN 105145181 A 12/2015
CN 209758204 U 12/2019
(Continued)

OTHER PUBLICATIONS

Office Action issued on Dec. 18, 2024 by the Australian Patent Office in corresponding Australian Application No. 2022286612 (4 pages) corresponding to Applicant's U.S. Appl. No. 18/565,859.
(Continued)

*Primary Examiner* — Kaitlin S Joerger
(74) *Attorney, Agent, or Firm* — Gregory Matt McCloskey

(57) ABSTRACT

A storage and retrieval system includes a grid framework structure having a track system arranged above storage columns, the track system including tracks arranged in a grid pattern of grid cells or grid spaces through which storage containers in a stack can be transferred. An upper level port column extends from the track system to a first access station at a first level for transferring storage containers between the track system and the inventory handling station assembly. A lower level port column extends from the track system to a second access station at a second level for transferring storage containers between the track system and the inventory handling station assembly.

17 Claims, 21 Drawing Sheets

(56) References Cited

U.S. PATENT DOCUMENTS

| | | | | |
|---|---|---|---|---|
| 7,766,151 | B2 | 8/2010 | Schaefer | |
| 9,026,243 | B2 | 5/2015 | Radwallner et al. | |
| 10,217,074 | B1 | 2/2019 | Stallman et al. | |
| 10,301,113 | B2 | 5/2019 | Steven et al. | |
| 10,555,466 | B2 | 2/2020 | Gonyer et al. | |
| 10,929,800 | B1 | 2/2021 | Stallman et al. | |
| 2014/0249666 | A1 | 9/2014 | Radwallner et al. | |
| 2017/0121109 | A1 | 5/2017 | Behling | |
| 2017/0129703 | A1 | 5/2017 | Lindbo et al. | |
| 2017/0140327 | A1 | 5/2017 | Lindbo | |
| 2018/0162639 | A1 | 6/2018 | Ingram-Tedd et al. | |
| 2019/0047787 | A1 | 2/2019 | Fosnight et al. | |
| 2019/0246571 | A1 | 8/2019 | Ingram-Tedd | |
| 2020/0407160 | A1 | 12/2020 | Ingram-Tedd et al. | |
| 2021/0032026 | A1* | 2/2021 | Lindbo | B65G 1/0414 |
| 2021/0039882 | A1 | 2/2021 | Fosnight et al. | |
| 2021/0229917 | A1 | 7/2021 | Austrheim | |
| 2021/0261336 | A1* | 8/2021 | Ingram-Tedd | B65G 1/0464 |
| 2021/0261337 | A1 | 8/2021 | Schedlbauer et al. | |
| 2022/0153518 | A1 | 5/2022 | Lindbo et al. | |
| 2022/0192114 | A1 | 6/2022 | Lee et al. | |
| 2022/0194702 | A1 | 6/2022 | Austrheim | |
| 2022/0374836 | A1* | 11/2022 | Miyamoto | G06Q 10/0875 |
| 2023/0002158 | A1* | 1/2023 | Hansl | B65G 1/0485 |
| 2023/0095494 | A1* | 3/2023 | Simpson | B65G 1/0492 700/216 |
| 2023/0202760 | A1* | 6/2023 | Yamashita | B65G 1/1378 700/216 |
| 2024/0199326 | A1* | 6/2024 | Karolinczak | B65G 1/0492 |
| 2024/0245010 | A1 | 7/2024 | Millward et al. | |
| 2024/0253902 | A1 | 8/2024 | Lindbo | |
| 2024/0262620 | A1 | 8/2024 | Ingram-Tedd | |

FOREIGN PATENT DOCUMENTS

| | | | |
|---|---|---|---|
| CN | 112978258 | A | 6/2021 |
| EP | 3617096 | A1 | 3/2020 |
| GB | 2148260 | A | 5/1985 |
| JP | 3192693 | U | 8/2014 |
| JP | 2018520965 | A | 8/2018 |
| JP | 2019058097 | A | 4/2019 |
| JP | 2020070173 | A | 5/2020 |
| JP | 2021510661 | A | 4/2021 |
| TW | M593932 | U | 4/2020 |
| WO | 2015019055 | A1 | 2/2015 |
| WO | 2015185628 | A2 | 12/2015 |
| WO | 2015197709 | A1 | 12/2015 |
| WO | 2016198467 | A1 | 12/2016 |
| WO | 2017178370 | A1 | 10/2017 |
| WO | 2018050816 | A1 | 3/2018 |
| WO | 2018069282 | A1 | 4/2018 |
| WO | 2018090081 | A1 | 5/2018 |
| WO | 2018233886 | A1 | 12/2018 |
| WO | 2019032651 | A1 | 2/2019 |
| WO | 2019141877 | A1 | 7/2019 |
| WO | 2019195027 | A1 | 10/2019 |
| WO | 2019229170 | A2 | 12/2019 |
| WO | 2019238639 | A1 | 12/2019 |
| WO | 2019238659 | A2 | 12/2019 |
| WO | 2019238702 | A1 | 12/2019 |
| WO | 2020014725 | A2 | 1/2020 |
| WO | 2020030825 | A1 | 2/2020 |
| WO | 2020154767 | A1 | 8/2020 |
| WO | 2020178696 | A1 | 9/2020 |
| WO | 2020200631 | A1 | 10/2020 |
| WO | 2020250166 | A1 | 12/2020 |
| WO | 2022034195 | A1 | 2/2022 |

OTHER PUBLICATIONS

Office Action issued on Feb. 4, 2025 by the Japanese Patent Office in corresponding Japanese Application No. 2023-574197 (4 pages) corresponding to Applicant's U.S. Appl. No. 18/565,859.

Office Action issued on Mar. 13, 2025 by the Canadian Patent Office in corresponding Canadian Application No. 3,221,049 (3 pages) corresponding to Applicant's U.S. Appl. No. 18/565,859.

Office Action (Examination Report No. 1) issued on Nov. 25, 2024, by the Australian Patent Office in corresponding Australian Patent Application No. 2022285112. (4 pages),.

Office Action (First Office Action) issued on Dec. 3, 2024, by the Japanese Patent Office in corresponding Japanese Patent Application No. 2023-574198, and an English Translation of the Office Action. (14 pages),.

Office Action issued on Sep. 23, 2024, by the Great Britain Patent Office in corresponding Great Britain Patent Application No. GB2118494.0. (4 pages),.

International Search Report (PCT/ISA/210) and Written Opinion (PCT/ISA/237) mailed on Nov. 28, 2022 by the European Patent Office as the International Searching Authority for International Application No. PCT/EP2022/064978. (26 pages).

International Search Report (PCT/ISA/210) and Written Opinion (PCT/ISA/237) mailed on Sep. 23, 2022 by the European Patent Office as the International Searching Authority for International Application No. PCT/EP2022/064657. (21 pages).

International Search Report (PCT/ISA/220) and Written Opinion (PCT/ISA/237) mailed on Sep. 19, 2022, by the European Patent Office as the International Searching Authority for International Application No. PCT/EP2022/064785. (16 pages).

International Search Report and Written Opinion mailed on Sep. 5, 2022, by the European Patent Office as the International Searching Authority for International Application No. PCT/EP2022/064660. (13 pages).

Patents Act 1977 Combined Search and Examination Report under Sections 17 & 18(3) issued Nov. 22, 2022 by the United Kingdom Patent Office for Application No. GB2207997.4. (6 pages).

Patents Act 1977: Combined Search and Examination Report under Sections 17 & 18(3) mailed on May 11, 2022, for corresponding Application No. GB2116750.7. (8 pages).

Patents Act 1977: Examination Report under Section 18(3) issued Jun. 26, 2023, by the United Kingdom Patent Office for Application No. GB2207997.4. (3 pages).

Patents Act 1977: Examination Report under Section 18(3) mailed Jul. 21, 2023, for corresponding Application No. GB2116750.7. (3 pages).

Patents Act 1977: Examination Report under Section 18(3) mailed on Oct. 27, 2023 for corresponding Application No. GB2116750.7. (3 pages).

Patents Act 1977: Search Report under Section 17 dated Nov. 22, 2022 issued by the United Kingdom Intellectual Property Office in corresponding Great Britain Application No. GB2207996.6. (4 pages).

Patents Act 1977: Search Report under Section 17(5) dated Mar. 7, 2022 issued by the United Kingdom Intellectual Property Office in corresponding Great Britain Application No. GB2107884.5. (4 pages).

Patents Act 1977: Search Report under Section 17(5) dated May 24, 2022 issued by the United Kingdom Intellectual Property Office in corresponding Great Britain Application No. GB2118494.0. (4 pages).

Examination Report issued on Dec. 5, 2025 by the European Patent Office in corresponding EP Application No. 22730904.4 (11 pages) corresponding to Applicant's U.S. Appl. No. 18/565,859.

* cited by examiner (a)

(b)

STORAGE AND RETRIEVAL SYSTEM

FIELD OF INVENTION

The present invention relates to the field of remotely operated load handling devices on tracks located on a grid framework structure for handling storage containers or bins stacked in the grid framework structure, more specifically to a grid framework structure for supporting the remotely operated load handling devices.

BACKGROUND

Storage systems comprising a three-dimensional storage grid structure, within which storage containers/bins are stacked on top of each other, are well known. PCT Publication No. WO2015/185628A (Ocado) describes a known storage and fulfilment system in which stacks of bins or containers are arranged within a grid framework structure. The bins or containers are accessed by load handling devices remotely operative on tracks located on the top of the grid framework structure. A system of this type is illustrated schematically in FIGS. 1 to 3 of the accompanying drawings.

As shown in FIGS. 1 and 2, stackable containers, known as bins or containers 10, are stacked on top of one another to form stacks 12. The stacks 12 are arranged in a grid framework structure 14 in a warehousing or manufacturing environment. The grid framework is made up of a plurality of storage columns or grid columns. The grid framework structure 14 comprises a plurality of upright members or upright columns 16 that support horizontal members 18, 20. A first set of parallel horizontal grid members 18 is arranged perpendicularly to a second set of parallel horizontal grid members 20 to form a grid structure comprising a plurality of grid cells extending in the horizontal plane and supported by the upright members 16. The members 16, 18, 20 are typically manufactured from metal and typically welded or bolted together or a combination of both. The bins 10 are stacked between the members 16, 18, 20 of the grid framework structure 14, so that the grid framework structure 14 guards against horizontal movement of the stacks 12 of bins 10, and guides vertical movement of the bins 10. Each grid cell in the grid framework structure has at least one grid column for storage of a stack of containers. FIG. 1 is a schematic perspective view of the grid framework structure 14, and FIG. 2 is a top-down view showing a stack 12 of bins 10 arranged within the framework structure 14. Each bin 10 typically holds a plurality of product items (not shown), and the product items within a bin 10 may be identical, or may be of different product types depending on the application.

A majority of the grid columns are dedicated for the storage of storage containers (otherwise as 'bins' or 'totes') in stacks and therefore considered to be storage columns, to differentiate them from a port column. A grid framework structure typically has at least one grid column which is not used for the storage of storage containers in a stack, but is a location where the robotic load handling device can drop off and/or pick-up storage containers so that they can be moved to an access station where the contents of the storage containers can be accessed from outside of the grid framework structure. The location of the grid cell where a robotic load handling device can drop off/pick up a storage container is termed a 'port' and the grid column in which the port is located is termed a 'port column'.

The top level of the grid framework structure 14 includes rails 22 arranged in a grid pattern across the top of the stacks 12. Referring additionally to FIG. 3, the rails 22 support a plurality of load handling devices 30. A first set 22*a* of parallel rails 22 guides movement of the robotic load handling devices 30 in a first direction (for example, an X-direction) across the top of the grid framework structure 14, and a second set 22*b* of parallel rails 22, arranged perpendicular to the first set 22*a*, guides movement of the load handling devices 30 in a second direction (for example, a Y-direction), perpendicular to the first direction. In this way, the rails 22 allow movement of the robotic load handling devices 30 laterally in two dimensions in the horizontal X-Y plane, so that a load handling device 30 can be moved into position above any of the stacks 12.

A known load handling device 30 shown in FIGS. 4 and 5 comprising a vehicle body 32 is described in PCT Patent Publication No. WO2015/019055 (Ocado), hereby incorporated by reference, where each load handling device 30 only covers one grid space of the grid framework structure 14. Here, the load handling device 30 comprises a wheel assembly comprising a first set of wheels 34 consisting a pair of wheels on the front of the vehicle body 32 and a pair of wheels 34 on the back of the vehicle 32 for engaging with the first set of rails or tracks to guide movement of the device in a first direction, and a second set of wheels 36 consisting of a pair of wheels 36 on each side of the vehicle 32 for engaging with the second set of rails or tracks to guide movement of the device in a second direction. Each of the sets of wheels is driven to enable movement of the vehicle in X and Y directions respectively along the rails. One or both sets of wheels can be moved vertically to lift each set of wheels clear of the respective rails, thereby allowing the vehicle to move in the desired direction.

The load handling device 30 is equipped with a lifting device or crane mechanism to lift a storage container from above. The crane mechanism comprises a winch tether or cable 38 wound on a spool or reel (not shown) and a grabber device 39. The lifting device comprises a set of lifting tethers 38 extending in a vertical direction and connected nearby or at the four corners of a lifting frame 39, otherwise known as a grabber device (one tether near each of the four corners of the grabber device) for releasable connection to a storage container 10. The grabber device 39 is configured to releasably grip the top of a storage container 10 to lift it from a stack of containers in a storage system of the type shown in FIGS. 1 and 2.

The wheels 34, 36 are arranged around the periphery of a cavity or recess, known as a container-receiving recess 40, in the lower part. The recess is sized to accommodate the container 10 when it is lifted by the crane mechanism, as shown in FIG. 5 (a and b). When in the recess, the container is lifted clear of the rails beneath, so that the vehicle can move laterally to a different location. On reaching the target location, for example another stack, an access point in the storage system or a conveyor belt, the bin or container can be lowered from the container receiving portion and released from the grabber device.

One significant drawback of the prior art systems are that they can only use containers of one specified footprint. In addition, the height of the containers is often constrained by the design of the robotic load handlers. This typically constrains the use of such systems to such items which fit inside the containers. In typical applications, this means that 1-10% of the total volume of goods in the storage system needs a different handling method, typically manual. This means added complexity in the system, low productivity and inefficient use of space. WO2015/197709 (Ocado Innovation Limited) attempts to address this problem by providing a grid framework structure having different sized grid cells that is configured to accommodate different sized storage containers. Thus, larger items that cannot be stored in the smaller storage containers can be stored in larger storage containers and the smaller items can be stored in the smaller storage containers. Different sized load handling devices are operable on the grid and are able to move the different sized storage containers.

Restricting a portion of the grid to accommodate larger storage containers reduces the packing density for the storage of smaller items, which account for bulk of the fulfilled orders. Thus, the storage capacity of the grid framework structure may become compromised should there be an increase in demand for the smaller items that are able to be stored in the smaller storage containers. A grid framework structure is thus required that is flexible to store larger items and smaller items, but which does not compromise the storage capacity of the grid framework structure.

The access station may typically be used as a picking station, where one or more items are removed from the storage containers delivered to the picking station, or a stocking 'decant' station, where one or more items are placed in the storage containers to replenish stock. When the contents of the storage container are requested, a robotic load handling device operative on the grid is instructed to move to a grid location where the target storage container is located and retrieve the target storage container using the lifting device of the robotic load handling device. The target storage container is transported to a drop-off port in the grid where it is lowered through a port column to a drop-off area. At the drop-off area, the target storage container is transported to the access station. At the access station, one or more items are picked from the storage container. Once the contents of the storage container are retrieved from the container at the access station, the storage container is transported to a pick up station where the storage container is subsequently picked up by a robotic load handling device and either returned to its original storage location or a new storage location. A conveyor system comprising conveyors is typically used to transport the storage containers to the access station from the drop-off area when dropped off from the port column.

The rate at which the items are picked from the storage containers at the access station is dependent on the number of storage containers at the access station, which in turn is dependent on how fast the storage containers can be conveyed to the access station and exit the access station. In some circumstances, one or more storage containers are held in a queue at the access station waiting to be transported to the pick-up area and subsequently picked-up by a robotic load handling device operable on the grid. WO2018/233886 (Autostore Technology AS) tries to address this problem by providing a container handling station comprising a horizontal container carousel comprising a first straight conveyor section and a second straight conveyor section interconnected by two intermediate conveyor sections. Each of the conveyor sections comprises at least one conveyor device for accommodating and moving a container in a horizontal direction. The first straight conveyor section (25) is arranged directly below multiple port columns (19, 20), such that any of the container handling vehicles (9) may transfer a container (6) between the top level of the grid and the first straight conveyor section (25) via any of the multiple port columns (19, 20). The second straight conveyor section (26) is arranged to allow access to a container (6) retrieved from the grid (4) via the first straight conveyor section (25). The container handling station is too complicated and requires multiple moveable parts to transport the storage container around the carousel. Moreover, the rate limiting step in processing the storage containers at the access station is dependent on how fast the storage containers can be transported around the carousel. In a majority of cases, an operator at the access station is left waiting until the storage containers at the access station is processed (i.e. items picked). Increasing the speed of the carousel to move the storage containers through the access station is limited by the speed at which the processed storage containers can be picked up from the pick-up area.

SUMMARY OF THE INVENTION

The present invention has mitigated the above problem by providing an inventory handling station assembly comprising a plurality of access stations that are vertically spaced at different levels or heights so that more storage containers can be presented to an operator or a robotic picking device at the inventory handling station assembly. The storage containers are arranged at different heights so that the operator can easily reach into the storage containers at the different levels and pick the items from the storage containers. In comparison to presenting the storage containers at the same level, having the storage containers presented to the operator at different heights increases the speed by which the operator can reach into and pick items from the storage containers since more of the storage containers are presented to an operator at any one time. Thus, the present invention provides a storage and retrieval system comprising:

A) a grid framework structure comprising:
   i) a plurality of storage columns for one or more storage containers to be stored in vertical stacks,
   ii) a track system arranged above the plurality of storage columns, the track system comprising a plurality of tracks arranged in a grid pattern extending in a substantially horizontal plane and comprising a plurality of grid cells or grid spaces through which the storage containers in a stack can be transferred between the plurality of storage columns and the top level of the track system;
B) an inventory handling station assembly comprising a first access station at a first level and a second access station at a second level, the first level being vertically spaced from the second level, for gaining access to the content of storage containers at the first and second access stations at the first and second levels respectively;
C) an upper level port column extending from the track system to the first access station at the first level for transferring storage containers between the track system and the inventory handling station assembly;
D) a lower level port column extending from the track system to the second access station at the second level for transferring storage containers between the track system and the inventory handling station assembly.

A plurality of upright columns can be arranged to form the plurality of storage columns for one or more of the storage containers to be stored in vertical stacks between and to be guided by the plurality of upright columns in a vertical direction. The upper level port column is arranged to drop off/pick up storage containers into and out of the first access station at a first level, and the lower level port column is arranged to drop off/pick up storage containers into and out of the second access station at a second level, the second level being below the first level. The upper level port column can be a vertical chute having a first opening for receiving a storage container lowered by at least one robotic load handling device operable on the track system through a grid cell and a second opening to allow the storage container to enter the first access station at the first level. Similarly, the lower level port column through which the storage containers can transferred between the track system and the inventory handling station assembly can be a vertical chute such that a robotic load handling device operative on the track system can drop off and/or pick up a storage container to or from the second access station at the second level. Alternatively, the upper level and/or the lower level port column can comprise a storage container lifting or lowering device through which the storage container can be automatically transferred between the track system and the first and second access station respectively.

To increase the visibility of the contents of the vertically spaced storage containers at the first and second access station, optionally the first access station is laterally offset from the second access station. To limit the footprint of the inventory handling station assembly, optionally the first access station at least partially overlays the second access station. Each level of the first and second level of the inventory handling station assembly is divided or segregated so that preferably, the first level of the inventory handling station assembly comprises a drop-off area and a pick-up area arranged below the upper level port column for transferring storage containers between the track system and the drop-off and the pick-up area at the first level; and the second level of the inventory handling station assembly comprises a drop-off area and a pick-up area arranged below the lower level port column for transferring storage containers between the track system and the drop-off and the pick-up area at the second level. For the purpose of definition, the term ‘drop-off area’ can sometimes be referred to ‘drop-off station’ and the term ‘pick-up area’ can sometimes be referred to ‘pick-up station’. As a result, the terms ‘drop-off station’ and ‘drop-off area’ can be used interchangeably in the patent specification to mean the same feature. Equally, the terms ‘pick-up area’ and ‘pick-up station’ can be used interchangeably in the patent specification to mean the same feature. Optionally, the upper and lower level port columns comprise a drop-off port column for allowing storage containers to be lowered from the track system to the drop-off area and a pick-up port column for allowing storage containers to be picked up from the pick-up area towards the track system. The upper and lower level port columns are configured with a drop-off port column through which a storage container can be dropped off to the respective drop-off area at the first level and the second level of the inventory handling station assembly. Similarly, the upper and lower port columns are configured with a pick-up port column through which a storage container can be picked up from their respective pick-up area at the first and second level of the inventory handling station assembly.

In order for the drop-off port column and the pick-up port column of the upper level port column and the lower level port column to drop off and pick up storage containers to and from the respective drop-off area and the pick-up area at the first level and the second level, preferably, the drop-off area at the first level is laterally offset from the drop-off area at the second level. Similarly, preferably the pick-up area at the first level is laterally offset from the pick-up area at the second level. As a result, the drop-off and pick-up areas at each of the first and second level are arranged below their respective upper level port column and lower level port column. The drop-off and pick-up areas at the first level being laterally offset from the drop-off and pick-up areas at the second level enables the drop-off port columns and the pick-up port columns of the upper and the lower level port columns to drop off and pick up storage containers directly to or from their drop-off and pick-up areas respectively.

To convey storage containers from the drop-off area to the pick-up area via the access station where the storage container is paused to enable the contents to be picked from or decanted into the storage containers at each of the first and second level of the inventory handling station assembly, preferably the first level comprises a first conveyor system configured to convey one or more storage containers from the drop-off area to the pick-up area via the first access station, and the second level comprises a second conveyor system configured to convey one or more storage containers from the drop-off area to the pick-up area via the second access station.

More preferably, each of the first and second conveyor systems comprises an entry conveyor unit, an exit conveyor unit, and at least one access conveyor unit, wherein the entry conveyor unit is arranged in the drop-off area and arranged to transport a storage container in a first transport direction from the drop-off area to the first or second access station, the exit conveyor unit is arranged in the pick-up area and arranged to transport a storage container from the at least one access conveyor unit to the pick-up area in a second transport direction, and the at least one access conveyor unit is arranged to transport a storage container from the drop-off area to the pick-up area via the respective first or second access station in a third transport direction.

The at least one access conveyor unit is configured to pause a storage container at the access station in order for items to be picked from or decanted into the storage container prior to the storage container being conveyed to the pick-up area.

To conserve space, and thus the footprint of the inventory handling station assembly, optionally the entry conveyor unit and the exit conveyor are arranged such that the first transport direction of the entry conveyor unit is opposite and parallel to the second transport direction of the exit conveyor unit, and the third transport direction of the at least one access conveyor unit is orthogonal to both the first transport direction of the entry conveyor unit and the second transport direction of the exit conveyor unit. In other words, the storage containers travel in a substantially “U” shaped direction from the drop-off area to the pick-up area via the access station. Alternatively, the conveyor system can be arranged such that the first transport direction of the entry conveyor unit is substantially orthogonal to both the second transport direction of the exit conveyor unit and the third transport direction of the at least one access conveyor unit such that the storage containers travel in a substantially ‘L’ shaped direction from the drop-off area to the pick-up area via the access station.

In the case where one or more items are required from a target storage container located deep within a stack of storage containers in a storage column, i.e. a plurality of storage containers are positioned above a target storage container in the storage column, it is necessary that one or more storage containers above the target storage container would need to be temporarily moved in order for a robotic load handling device operative on the track system to access the target storage container. This process of accessing a target storage container within a stack in a storage column is known in the industry as “digging”. The process of digging a target storage container from a stack of storage containers in a storage column can be performed by the same robotic load handling device that is subsequently used to move the target storage container to the drop-off port, or by a plurality of robotic load handling devices that work together with one robotic load handling device instructed to remove one or more storage containers from the target storage container and another robotic load handling device to remove the target storage container for delivery to the inventory handling station assembly via the drop-off port. The removed storage containers from the stack can be repositioned in the original storage column, or alternatively, relocated to another storage column. The process of 'digging' a target storage container from a stack in a storage column is both time consuming and requires at least one additional operation in order to access the target storage container.

To present invention has mitigated the problem of digging by providing a second track system arranged above a second plurality of storage columns, so that the storage containers can be spread out through different areas of the grid framework structure, reducing the need to dig out storage containers. For example, the storage containers can be divided out into a first or a second plurality of storage columns so that the more frequently requested storage containers are in one area of the grid framework structure and the other area of the grid framework structure is arranged to store the less frequently requested storage containers. More specifically, the grid framework structure further comprises:

i) a second plurality of storage columns for one or more storage containers to be stored in vertical stacks;
ii) a second track system arranged above the second plurality of storage columns, the track system comprising a plurality of tracks arranged in a grid pattern extending in a substantially horizontal plane and comprising a plurality of grid cells or grid spaces through which the storage containers in a stack can be transferred between the second plurality of storage columns and the top level of the second track system, wherein the second track system is vertically spaced from the track system such that the track system and the second track system share the same inventory handling station assembly;
iii) a second upper level port column extending from the second track system to the first access station at the first level for transferring storage containers between the second track system and the inventory handling station assembly; and
iv) a second lower level port column extending from the second track system to the second access station at the second level for transferring storage containers between the second track system and the inventory handling station assembly.

For the purposes of this description, the track system will be referred to as a first track system. Another benefit of segregating the grid framework structure into a first area comprising the (first) track system and a second area comprising the second track system is an increase in the throughput of storage containers to the inventory handling station assembly as the different areas of the grid framework structure comprising the first and second track systems respectively are able to take advantage of the multiple access stations at the different levels of the inventory handling station assembly. Like the first track system, the second upper level port column extends from the second track system to the first access station at the first level for transferring storage containers between the second track system and the inventory handling station assembly; and the second lower level port column extends from the second track system to the second access station at the second level for transferring storage containers between the second track system and the inventory handling station assembly. As discussed above, the second upper level port column can be a vertical chute having a first opening for receiving a storage container lowered by at least one load handling device operable on the second track system through a grid cell, and a second opening to allow the storage container to enter the first access station at the first level. Similarly, the second lower level port column through which the storage containers can be transferred between the second track system and the inventory handling station assembly can be a vertical chute such that a robotic load handling device operative on the track system can drop off and/or pick up a storage container from the second access station at the second level.

In an example where the track system is arranged vertically above the second track system and to accommodate the upper and lower level port columns of both track systems (track and second track systems), optionally, at least a portion of the track system (first track system) overhangs the second track system. As a result, the at least portion of the track system overhanging the second track system comprises the upper level port column for transferring storage containers between the track system and the first access station of the inventory handling station assembly and/or the second lower level port column for transferring storage containers between the track system and the second access station of the inventory handling station assembly. In this way, a robotic load handling device operable on the track system (first track system) is able to transfer storage containers directly to the first and/or second access stations at the different levels of the inventory handling station assembly via their respective upper level port column and lower level port column without the need to extend through one or more grid cells of the second track system below. Alternatively, the upper and/or lower level port columns from the track system can extend through the one or more grid cells of the second track system to transfer one or more storage containers to the first and second access stations of the inventory handling station assembly via their respective upper and lower level port columns. A robotic load handling device operable on the second track system is able to transfer storage containers to the first and second access stations of the inventory handling station assembly via their respective upper level port column (second upper level port column) and lower level port column (second lower level port column). In other words, both the track system and the second track system can share the same or have a common inventory handling station assembly due to having at least a portion of the upper track system overhanging the second track system to enable a robotic load handling device having access to the inventory handling station assembly below. An additional benefit of the first and second track systems at different levels is that they offer a neat and compact way of bringing both chilled and ambient items to the same inventory handling station assembly. For example, the different areas of the grid framework structure comprising the first and second track systems respectively can be arranged with separate chilled and ambient areas of the grid framework structure. The different areas of the grid framework structure can be increased to include a third area comprising a frozen section. For the purpose of definition, the ambient area covers temperatures in the range 21° C. to 50° C., chilled temperatures covers the temperature range 2° C. to 8° C. and the freezer temperatures cover the temperature range −21°

C. to −16° C. Additionally, the plurality of tracks can be arranged such that the track system and/or the second track system comprises:

i) a small cell portion comprising a first set of grid cells,
ii) a large cell portion comprising a second set of grid cells, wherein at least one dimension of each grid cell of the second set of grid cells is a multiple of at least one dimension of each grid cell of the first set of grid cells.

The small cell portion comprises a first set of parallel tracks extending in a first direction and a second and third sets of parallel tracks extending in a second direction, the second direction being substantially perpendicular to the first direction. The first, second and third sets of parallel tracks being arranged in a grid pattern to define a first set of grid cells, each grid cell of the first set of grid cells having a dimension extending in the first direction and a dimension extending in the second direction to define a first type grid cell opening. The large cell portion comprises a second set of grid cells, the second set of grid cells being defined by the first and second sets of parallel tracks, each grid cell of the second set of grid cells having a dimension extending in the first direction and a dimension extending in the second direction to define a second type grid cell opening. In the first direction, the dimension of the second type grid cell opening is a multiple of the dimension of the first type grid cell opening, and in the second direction, the dimension of the first type grid cell opening is substantially equal to the dimension of the second type grid cell opening. The multi-cell sizes of the track system and/or the second track system provide different grid cell openings through which different sized storage containers can exit or be lowered through the grid cell. The different sized storage containers can be used to store different sized items, and thereby increase the flexibility to extend the storage facility of the storage and retrieval system of the present invention to general merchandise. The plurality of parallel sets of tracks can be arranged such that either the first or second track systems comprise the first and second sets of grid cells or both the first and second track systems comprise the first and second sets of grid cells. Alternatively, the track system comprises both the first and second sets of grid cells and the second track system comprises the first set of grid cells. To enable a robotic load handling device to move on the track system and the second track system, the storage and retrieval system further comprises:

i) a first type robotic load handling device comprising a first vehicle wheel assembly comprising a first set of wheels having a first track width and a second set of wheels having a second track width,
ii) a second type robotic load handling device operable on the track system, said second type robotic load handling device comprising a second vehicle wheel assembly comprising a first set of wheels having a first track width and a second set of wheels having a second track width, wherein the first track width of the first vehicle wheel assembly is substantially equal to the first track width of the second vehicle wheel assembly, and the second track width of the second vehicle wheel assembly is a multiple of the second track width of the first vehicle wheel assembly such that the first type robotic load handling device is able to move in both the first and second directions on the first set of grid cells and the second type robotic load handling device is able to move in both the first and second direction on the second set of grid cells; and wherein the first type robotic load handling device and/or second type robotic load handling device is/are operable on the track system and/or second track system.

DESCRIPTION OF DRAWINGS

Further features and aspects of the present invention will be apparent from the following detailed description of an illustrative embodiment made with reference to the drawings, in which.

DETAILED DESCRIPTION

Figure 1:
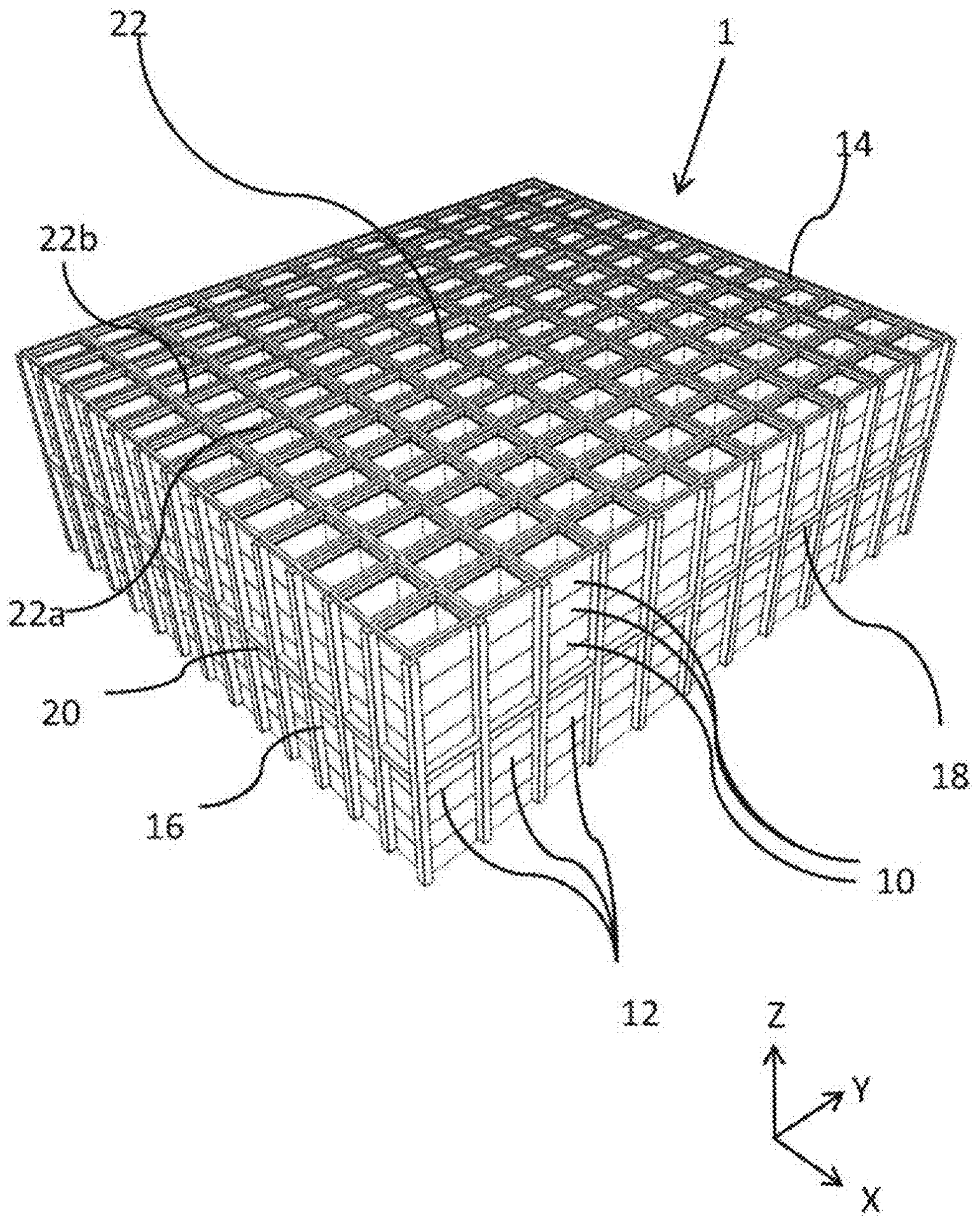
Figure 1 (PRIOR ART)
FIG. 1 is a schematic diagram of a grid framework structure according to a known system.
Figure 2:
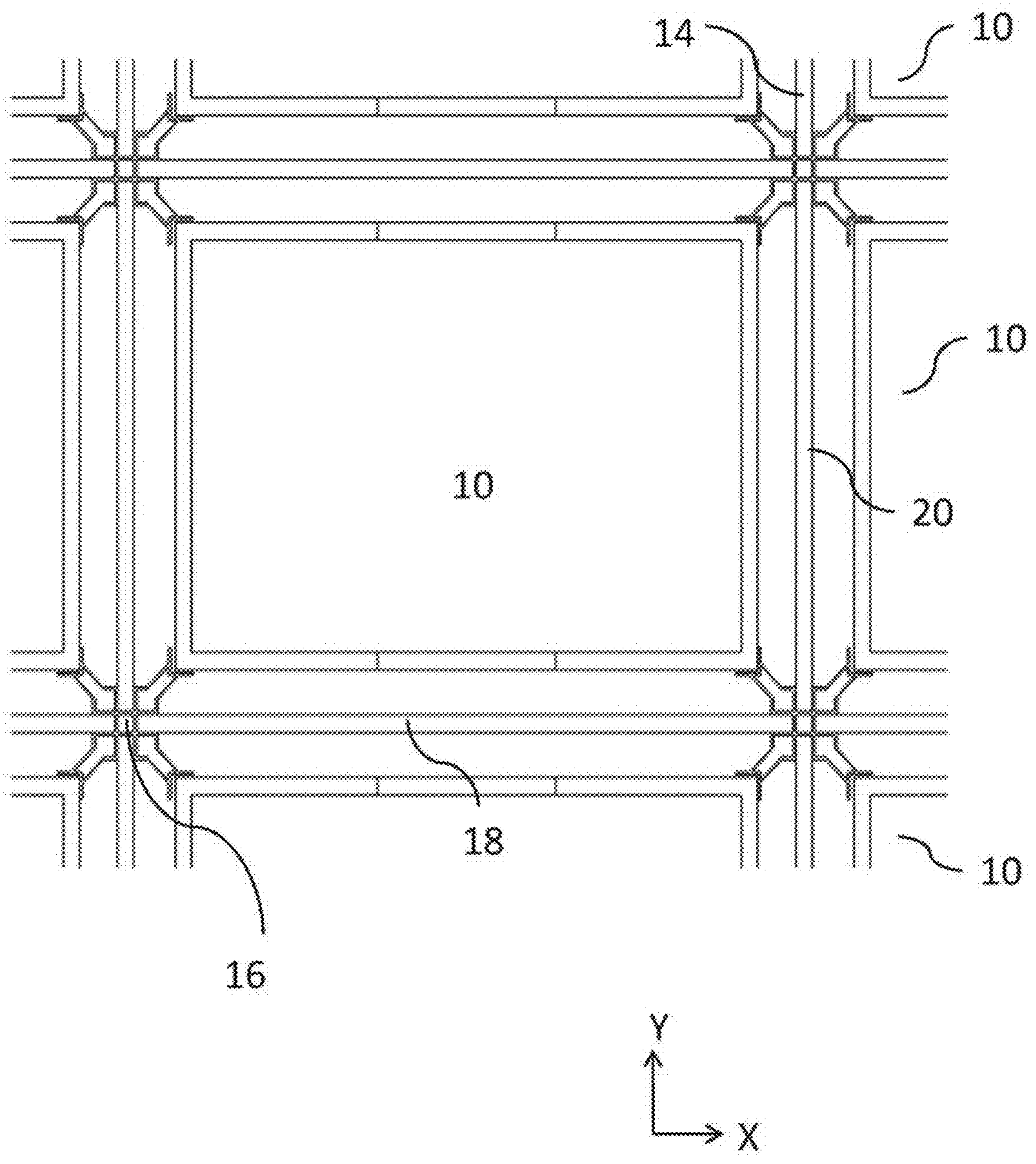
Figure 2 (PRIOR ART)
FIG. 2 is a schematic diagram of a top down view showing a stack of bins arranged within the framework structure of FIG. 1.
Figure 3:
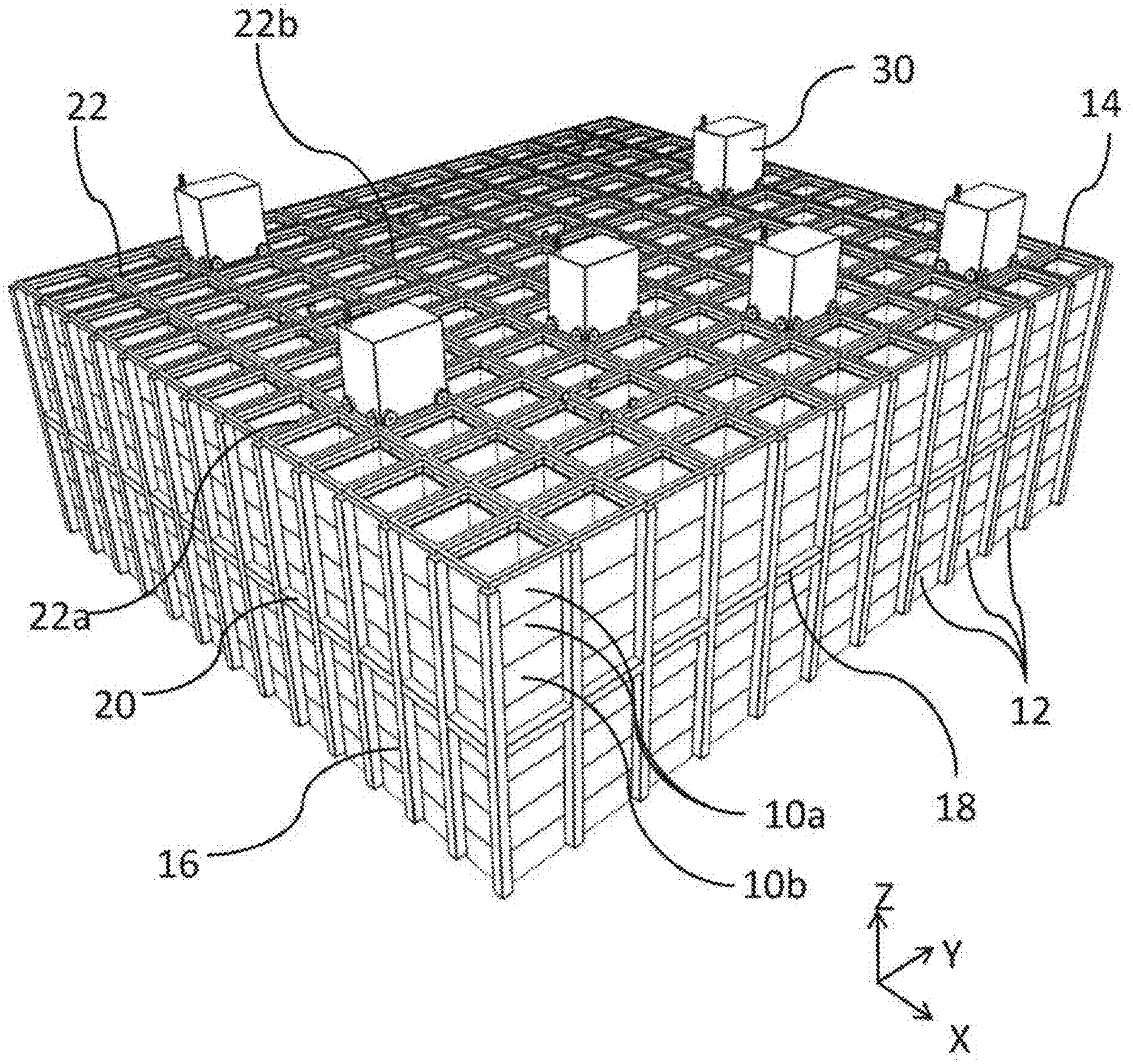
Figure 3 (PRIOR ART)
FIG. 3 is a schematic diagram of a system of a known load handling device operating on the grid framework structure.
Figure 4:
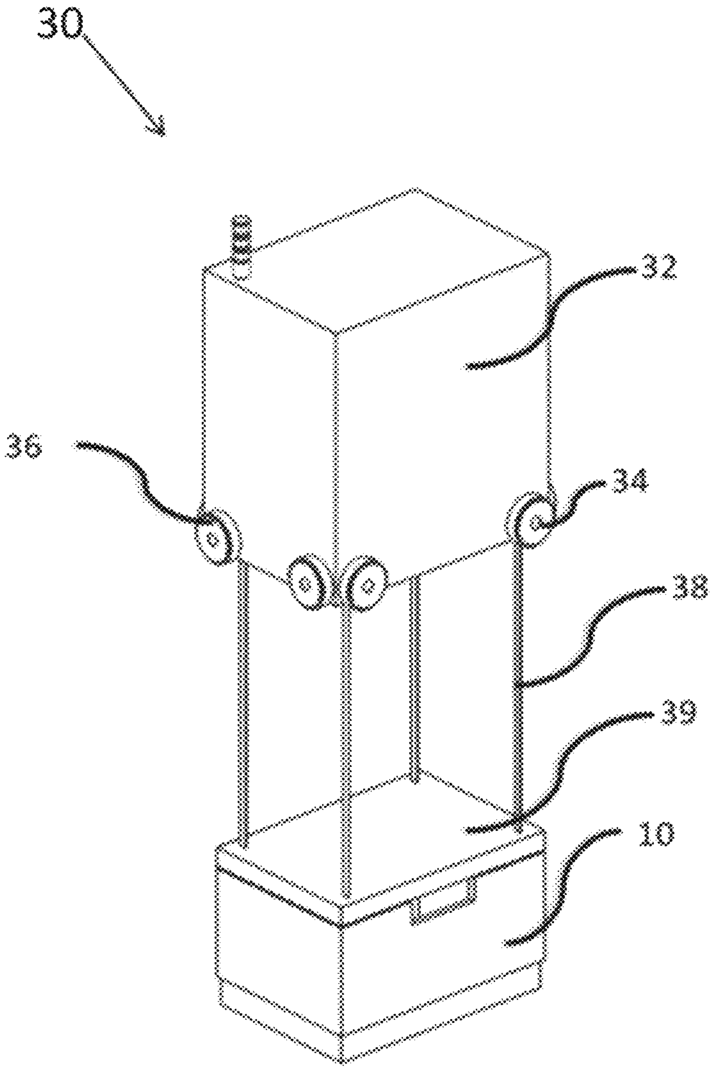
Figure 4 (PRIOR ART)
FIG. 4 is a schematic perspective view of the load handling device showing the lifting device gripping a container from above.
Figure 5:
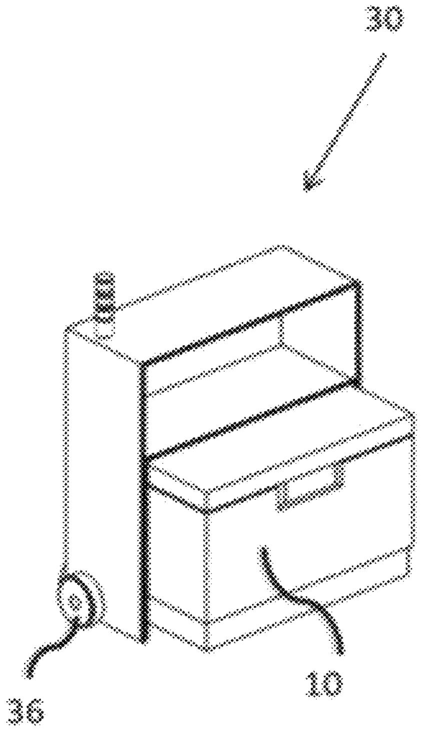
Figure 5 (a) (Prior Art)
FIGS. 5(*a*) and 5(*b*) are schematic perspective cut away views of the load handling device of FIG. 4 showing (a) the container receiving space of the load handling device and (b) a container accommodated within the container receiving space of the load handling device.
Figure 5:
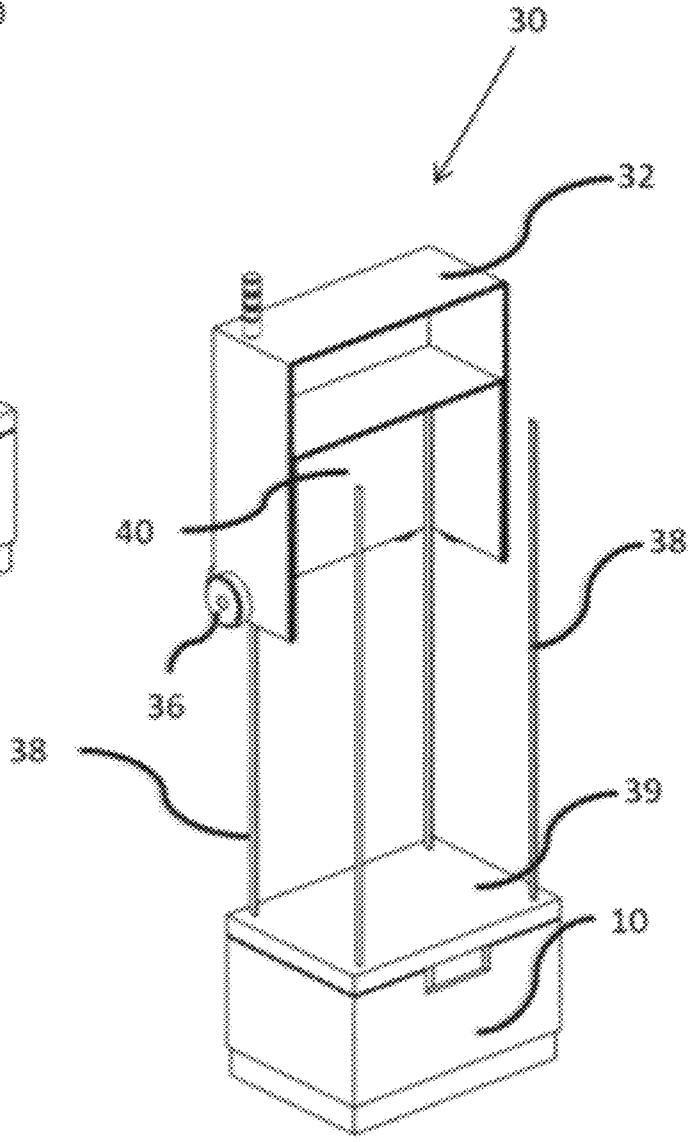
Figure 5 (b) (Prior Art)
Figure 6A:
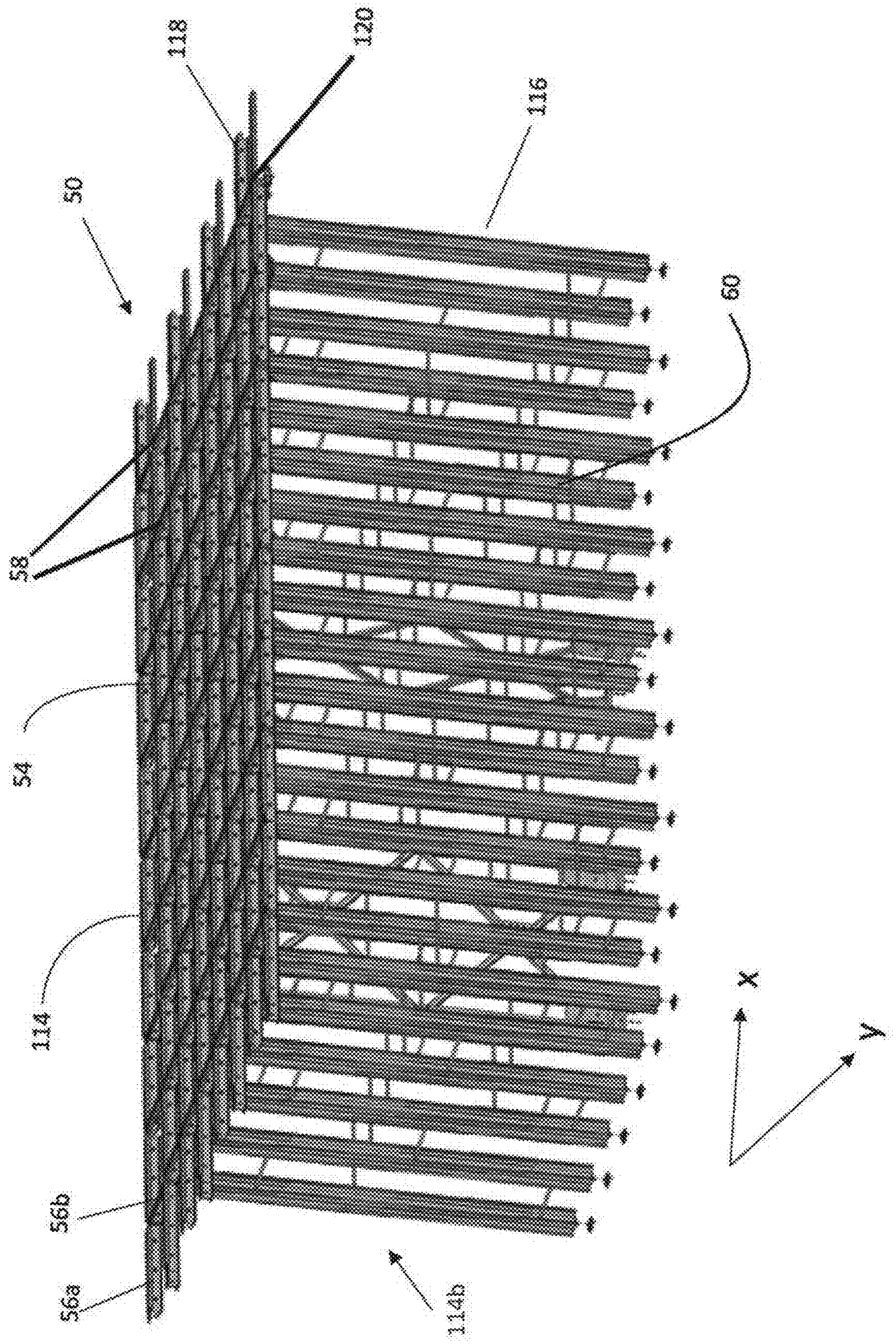
FIG. 6*a* is a perspective side view of a known grid framework structure comprising uniform grid cells.

FIG. 6*a* shows a perspective side view of a typical 3 dimensional grid framework structure 114 comprising grid cells of uniform size. The basic components of the grid framework structure 114 comprise a track system or grid 50 lying in a horizontal plane mounted to a supporting framework structure 114*b*. The supporting framework structure 114*b* can comprise a plurality of upright columns 116 arranged in a grid pattern so that each upright column is located at the intersection of the parallel sets of tracks as shown in FIG. 2 and taught in WO2015/185628A (Ocado). Alternatively, the supporting framework structure can comprise a plurality of prefabricated modular panels arranged in a grid pattern, the detail of which is fully described in the PCT application, WO2022034195A1, in the name of Ocado Innovation Ltd, and incorporated herein by reference. The structural components of the prefabricated modular panels comprises a plurality of upright columns to support the track system. Thus, the feature "upright columns" is thus broadly construed to cover the upright columns in the three dimensional grid framework structure taught in WO2015/185628A (Ocado Innovation Ltd) as well as forming part of the prefabricated modular panels taught in WO2022034195A1, in the name of Ocado Innovation Ltd. The term "upright member(s)" and "upright column(s)" are used interchangeably in the description to mean the same thing.

As shown in FIG. 6*a*, the track system 50 comprises a series of horizontal intersecting beams or grid members 118, 120 arranged to form a plurality of rectangular frames or grid openings 54, more specifically a first a set of parallel grid members 118 extending in a first direction (X) and a second set of parallel grid members 120 extending in a second direction (Y), the second set of parallel grid members 120 running transversely to the first set of parallel grid members 118 in a substantially horizontal plane. The first and the second set of parallel grid members supports a first and a second set of parallel tracks 56*a*, 56*b* respectively to define a track system for a load handling device to move one or more containers on the grid framework structure. Each of the grid members 50 can made up of a track support and a separate track or rail mounted to the track support. Alternatively, the track can be integrated into the grid member 50 as a single body, e.g. by extrusion.

The rail or tracks are typically profiled to guide a load handling device on the grid structure and are typically profiled to provide either a single track surface so as to allow a single load handling device to travel on the track or a double track so as to allow two load handling devices to pass each other on the same track. In the case where the tracks are profiled to provide a single track, the track comprises opposing lips (one lip on one side of the track and another lip at the other side of the track) along the length of the track to guide or constrain each wheel from lateral movement on the track. In the case where the profile is a double track, the track comprises two pairs of lips along the length of the track to allow the wheels of adjacent load handling devices to pass each other in both directions on the same track. To provide two pairs of lips, the track typically comprises a central ridge or lip and a lip either side of the central ridge.

Figure 6B:
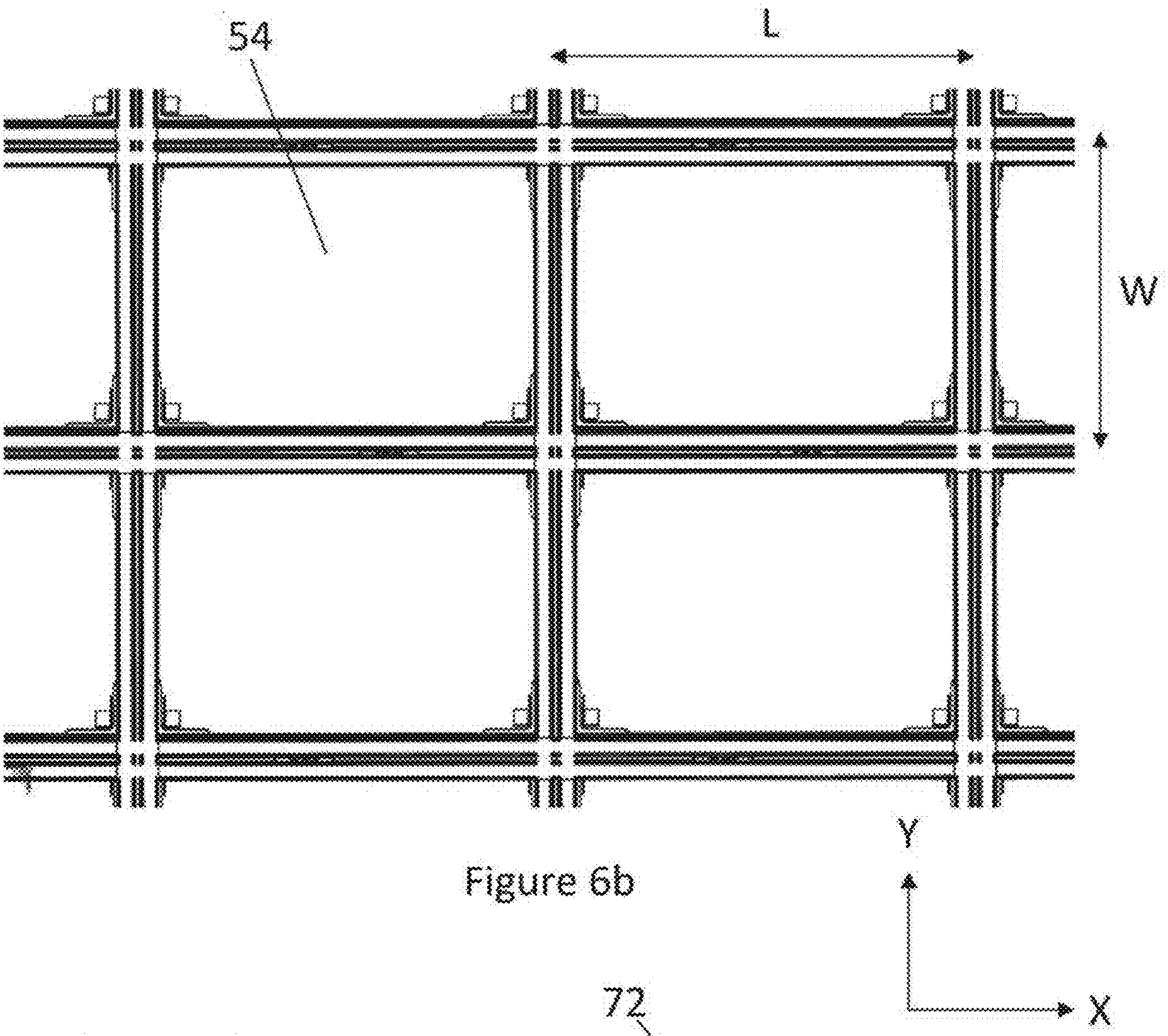
FIG. 6*b* is a schematic representation of top down view of the grid framework structure shown in FIG. 6*a*.

The first and second sets of parallel tracks arranged in a grid pattern define a set of grid cells, each grid cell comprising a grid opening or grid spacing through which one or more storage containers can pass through the grid opening. The containers are generally rectangular in shape having a length longer than its width. FIG. 6*b* shows a top plan view of a section of the track system showing the arrangement of the first and second sets of parallel tracks in a grid pattern. Each of the grid cells is rectangular in shape having a dimension extending in the first direction (X-direction) and a dimension extending in the second direction (Y-direction) to define a grid opening. Typically, the shape of each grid cell is rectilinear and therefore, according to FIG. 6*b*, the dimension extending in the first direction is the length of the grid cell and the dimension extending in the second direction is the width of the grid cell. The length and width of the grid cell are denoted in FIG. 6*b* by the reference 'L' and 'W'. For the rectilinear shaped grid cells illustrated in FIG. 6*b*, the length is greater than the width.

In a typical grid framework structure, the size of each of the grid openings is uniform throughout the track system so as to accommodate a uniform sized storage container. As a result, the footprint of the robotic load handling defined by the wheel assembly of the robotic load handling device, comprising a first set of wheels and a second set of wheels which are able to engage with the first set of parallel tracks for movement of the robotic load handling device in the first direction and the second set of parallel tracks for movement of the robotic load handling device in the second direction.

One or more stacks of storage containers are arranged below the respective grid openings of the track system, so that a robotic load handling device operative on the track system can drop off and/or pick up a storage container from a stack. The track system is raised above ground level by being mounted to the plurality of upright columns 116 at the intersections or nodes 58 where the grid members 118, 120 cross so as to form a plurality of vertical storage locations 60 for the storage containers to be stacked between the upright columns 116 and be guided by the upright columns 116 in a vertical direction through the plurality of substantially rectangular frames 54. For the purpose of the present invention, a stack of containers can encompass a plurality of containers or one or more containers in a stack. The grid framework structure 114 can be considered as a rectilinear assemblage of upright columns 116 supporting the track system 50 formed from intersecting horizontal grid members 118, 120, i.e. a four wall shaped framework. Two or more of the upright columns can be braced by at least one diagonal bracing member to increase structural stability of the grid framework structure 114. For the purpose of the present invention, the terms "vertical upright column", "upright column" and "upright member" are used interchangeably through the description. For the purpose of explanation of the present invention, the intersections 58 constitute nodes of the grid structure.

Figure 6C:
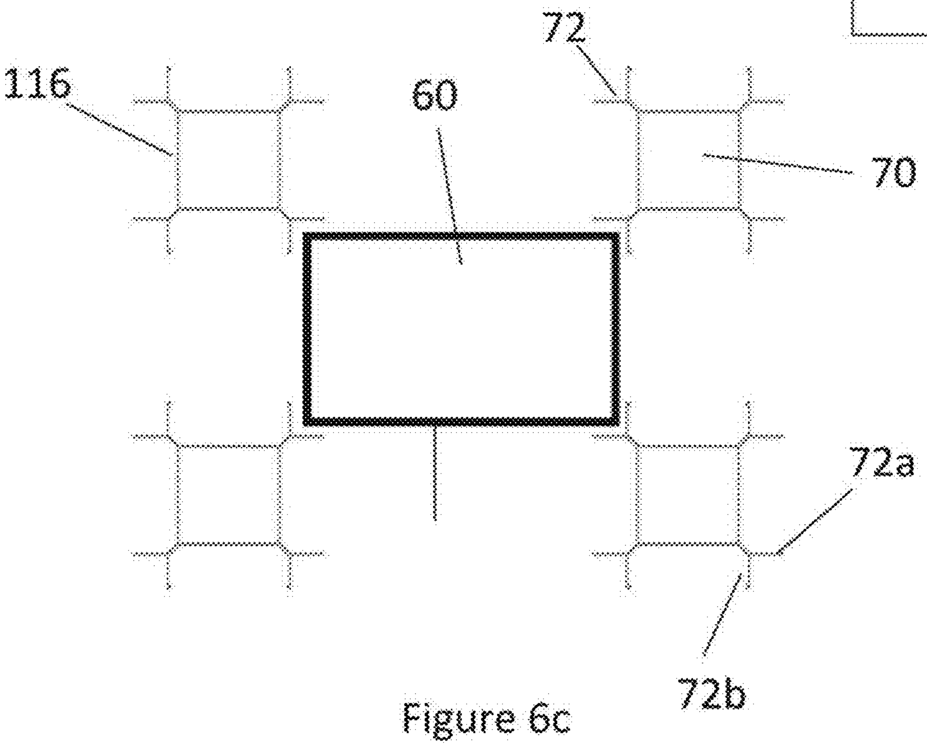
FIG. 6*c* is a schematic representation of a top down view of the arrangement of the upright columns of a single grid cell.

FIG. 6*c* shows a cross-sectional top view of the upright columns 116 of the present invention arranged within the grid framework structure to provide storage locations 60 for containers 110 in a stack to be guided along the upright columns 116 and through a grid cell 54. The terminology 'storage location' can sometimes be referred to 'storage column' and such terms can be used interchangeably throughout the description to mean the same feature. The spacing between the upright columns is sized to accommodate one or more containers or storage bins 110, which are generally rectangular, in a stack. Each of the upright columns is generally tubular. Each of the upright columns 116 comprises a hollow centre section 70 with one or more guides 72 mounted to or formed at the corners of the upright column 116 that extend along the longitudinal length of the upright column 116 for guiding the movement of the storage containers. The hollow centre section 70 of the upright columns aids the low weight of the grid framework structure. Typically, the hollow centre section 70 of the upright column is a box section. To at least one corner of the box section is mounted or formed a guide or corner section 72. However, there is no restriction to the cross-sectional shape of the hollow centre section of the upright column being a box section as other shaped cross-sectional sections such as circular, triangular, are applicable in the present invention.

Figure 7:
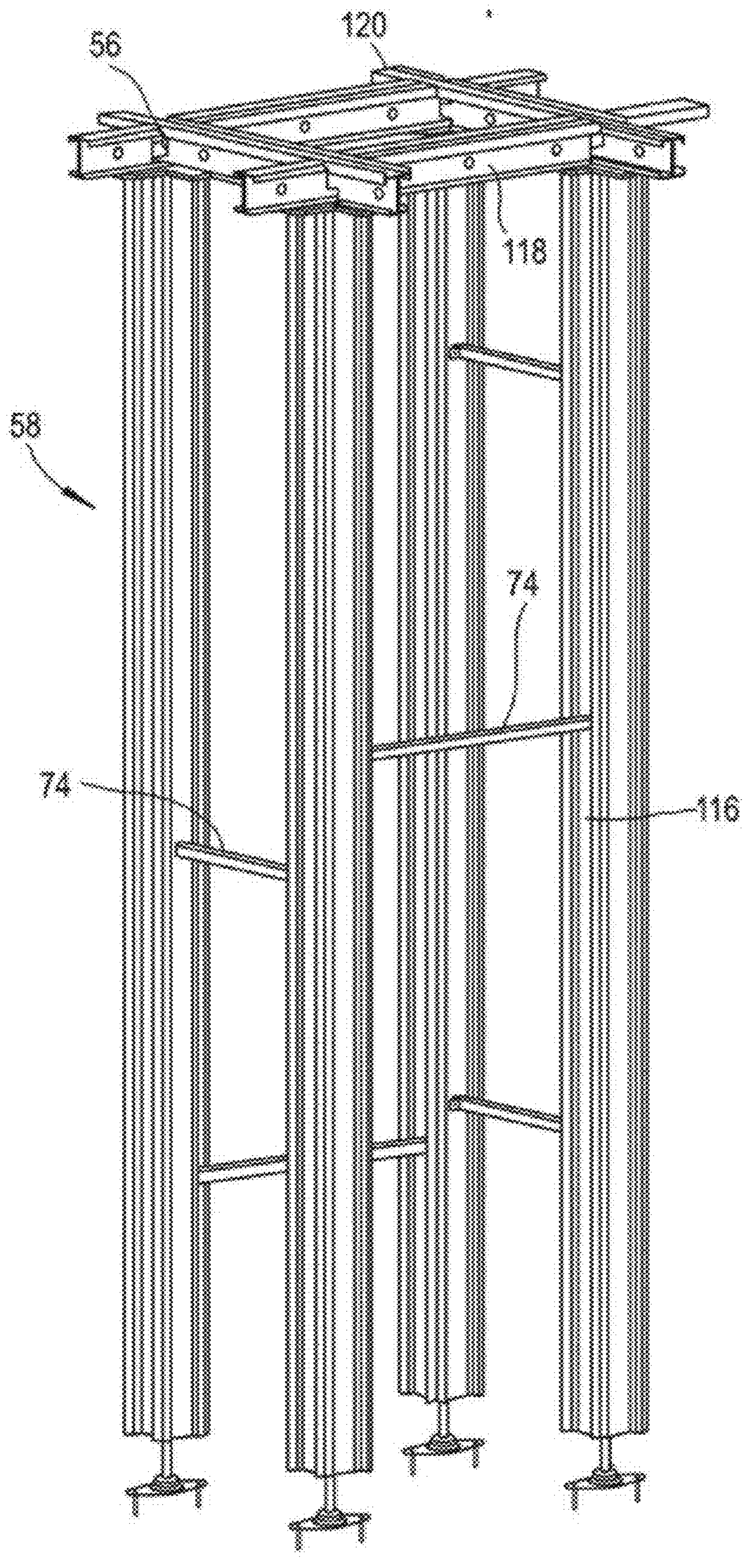
FIG. 7 is a perspective view of a storage space or column within a grid framework structure according to an embodiment of the present invention.

The upright columns 116 are spaced apart as shown in FIG. 7 so that the guides 72 mounted to the corners of different box sections cooperate with each other to provide a single storage location 58 for guiding the movement of containers vertically in a stack along the upright columns. Depending on the position of the upright columns 116 in the grid framework structure, guides 72 are mounted to one or all four corners of the box section of the upright column 116. For example, when forming part of an exterior wall-shaped framework of the grid framework structure only one or two of the corners of the hollow centre section can comprise a guide or corner section 72 so as to cooperate with one or two corners of a container in a stack. In the case where the upright column 116 is positioned within the interior of the grid framework structure, all four corners of the box centre section comprises a guide or corner section 72, and each of the upright columns 116 is arranged for cooperating with the corners of four containers 110.

In the particular embodiment of the present invention, each of the guides 72 is shown as V-shaped or has a 900 cross-sectional profile that is shaped to butt up against or accommodate the corner profile of the storage containers, which are generally rectangular in shape. As shown in FIG. 6*c*, the guides comprises two perpendicular plates 72*a*, 72*b* (two container guiding plates perpendicular to each other) that extend longitudinally along the length of the upright column 116. The upright columns 116 of the present invention can be formed as a single body, e.g. by means of extrusion. Different materials can be used to fabricate the upright columns including but not limited to metals, e.g. aluminium, steel or even composite materials that have sufficient structural rigidity to support the grid and the load handling devices traveling on the grid structure.

At least a portion of the plurality of the upright columns 116 are held in space relation with each other in the grid framework structure by one or more spacers or struts 74 connected between adjacent upright columns 116 (see FIG. 7). The spacers 74 extend transversely to (or perpendicular to) the longitudinal direction of the upright column 116 and are bolted or riveted to opposing walls of two adjacent upright columns by one or more bolts or rivets. The length of the spacers or struts 74 are sized such that adjacent upright columns 116 are spaced apart sufficiently to accommodate one or more containers in a stack between the upright columns 116. FIG. 7 shows a perspective view of four upright columns 116 held in spaced apart relation with each other by one or more spacers or struts 74 to form a storage column or storage location 58 that is sized to accommodate one or more containers in a stack.

The spacers 74 are sized to fit between the corner sections comprising the guides 72 of the upright column 116 so as to allow the upright columns to accommodate a stack of containers between the adjacent upright columns 116, i.e. the spacers do not impede or cross the area (or vertical storage location) occupied by the guides 72 or guiding plates at the corners of the upright column. One or more spacers/struts 74 are distributed in spaced apart relation along the length of two adjacent upright columns 116 in the grid framework structure (see FIG. 7). The storage location or storage column shown in FIG. 7 comprises four adjacent upright columns 116 held in spaced apart relation within the grid framework structure by one or more spacers or struts 74.

Upon receipt of an order, a robotic load handling device operative to move on the tracks is instructed to pick up a storage container containing the item to fulfil the order from a stack in the grid framework structure and transport the storage container to an inventory handling station assembly whereupon the item can be retrieved from the storage container and transferred to one or more delivery containers. The term 'robotic load handling device' is sometimes referred to as a 'bot' and such terms are used interchangeably throughout the description to mean the same feature. Typically, the inventory handling station assembly comprises a container transport assembly to transport one or more storage containers to an access station where the contents of the containers can be accessed. The container transport assembly is typically a conveyor system comprising multiple adjacent conveyor units. Further detail of the inventory handling station assembly is discussed below.

A typical layout of a fulfilment centre for fulfilment of an order comprises two distinct grid areas known as an ambient grid area and a chill grid area. Each of the ambient grid area and the chill grid area comprises a grid framework structure, i.e. the ambient grid area comprises a first grid framework structure and the chill grid area comprises a second grid framework structure. The ambient grid area stores food and grocery commodities at an ambient controlled temperature. The ambient controlled temperature covers a range between substantially 4° C. to substantially 21° C., preferably substantially 4° C. to substantially 18° C. Likewise, the chill grid area stores food and grocery commodities at a chilled temperature. The chilled temperature covers a range between substantially 0° C. to substantially 4° C. The two grid areas—ambient and chill—are filled with containers (otherwise known as storage containers, totes, or bins) containing various grocery products. Storage containers or bins storing commodity and grocery items are transported by load handling devices operative on the grid to a pick station or pick area in the pick aisle, where one or more items are picked from the storage bin or container at the pick station or pick area and transferred to one or more delivery containers.

Depending on the type of item, each of the one or more items will be classified with a particular SKU or stock keeping unit. As is commonly known in the art, a SKU or stock keeping unit is used by retailers to identify and track its inventory or stock. A SKU is a unique code consisting of letters and numbers that identify characteristics about each item, such as manufacturer, brand, style, colour and size. This can be recorded in a barcode. The characteristic SKU of the items and the identification of the storage bin is stored in an inventory database which is accessible by a control system or storage control and communication system. When stocking the storage system with items or replenishing the inventory of the storage system, items delivered from a supplier are transported to a decant station or a supply station. Here, the items are removed from their packaging and depending on the type of item, registered with a unique stock keeping unit or SKU, and placed in storage bins at the decant station. At the decant station, the storage bins are transported to a bin lift device whereupon they are lifted to the track system at grid level to be retrieved by a load handling device and transported to a location within the grid framework structure. Typically, a particular SKU is dedicated to a storage container and there is little or no mixing of SKUs within a single storage container. As a result, one or more storage containers are dedicated to a particular SKU.

As the grid framework structure provides the ability to densely store storage containers, the size of the items in storage is very much limited by the size of the storage containers. The size of a storage container is given by its length×width×depth. A typical standard storage container is of approximately of size 600 mm×400 mm×350 mm. Whilst most grocery items are able to be accommodated within the storage containers, this cannot be said for some non-grocery items, e.g. electrical items or clothing. For a fulfilment system offering general merchandise, the grid framework structure may be required to store items that may not be able to be stored in a standard sized storage container. As a result, different sized storage containers would be required to store the larger items and this adds a new level of complexity to the grid framework structure and the robotic load handling devices operating on the track system. Even if larger storage containers are provided in the grid framework structure as taught in WO2015/197709 (Ocado Innovation Limited), there is little or no flexibility to convert the larger storage containers into smaller storage containers should there be a shift in consumer buying habits. Typically, 1-10% of the total sales volume in the retail of general merchandise represents large items and this can vary throughout a given year. One or more dedicated robotic load handling device having a bigger footprint than the footprint of the robotic load handling devices operating on the smaller grid cells are able to access the large storage containers below the bigger grid cells. Dedicating a proportion of the grid framework structure for the storage of large items reduces the effectiveness of the grid framework structure to increase the storage capacity for storing smaller items without mixing the SKUs in a single large storage container. Even if multiple different SKU items are stored in a single large storage container, it would be necessary for a robotic load handling device operating on the larger grid cells to pick up the entire storage container containing the unwanted SKU items from its storage column and transport it to a pick station. Either way, this represents a less efficient way to store items in the grid framework structure and removes the flexibility of the grid framework structure to vary the proportion of large and small grid cells.

Additionally, in the case where a majority of the items in storage occupy a relatively small fractional volume of a standard storage container, the remaining volume of the storage container is unused. As the storage containers are typically of a standard size and considering that hundreds or even thousands of storage containers are densely packed within a typical storage and retrieval system comprising the grid framework structure, the accumulation of this free space from multiple storage containers in storage can represent a relatively large proportion of the storage volume of the grid framework structure.

Figure 8:
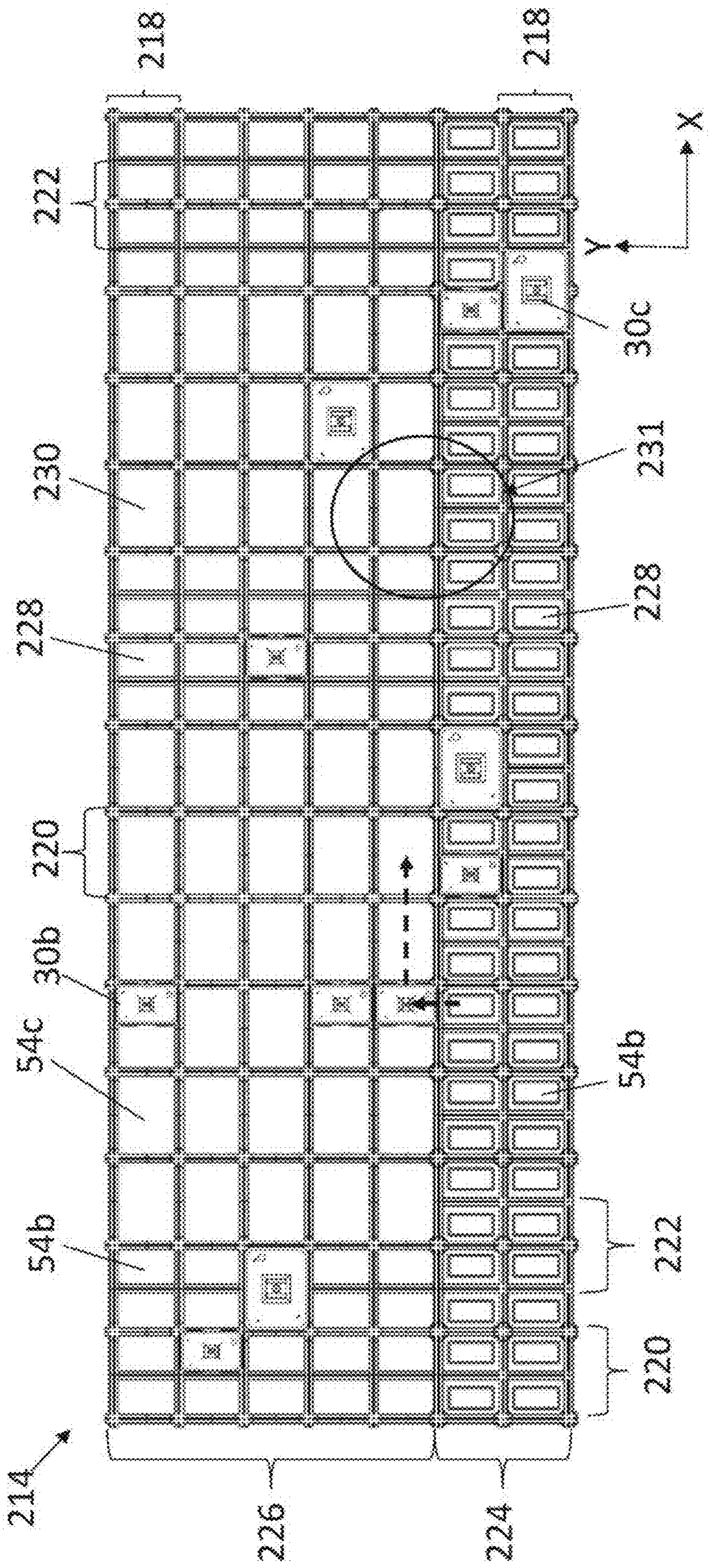
FIG. 8 is a schematic representation of a top plan view of the track system according to an embodiment of the present invention.

The present invention shown in FIG. 8 has mitigated the above problem by providing a grid framework structure comprising an integrated or single track system 214 that is able to permit robotic load handling devices having a wheel assembly with a different sized footprint to move different sized storage containers on the track system and not be constrained by the particular footprint of the wheel assembly. In contrast to the arrangement of the tracks shown in FIG. 6*a*, the track system 214 according to the present invention shown in FIG. 8 comprises three sets of parallel tracks 218, 220, 222 arranged in a grid pattern to provide two areas or portions 224, 226 for the movement of different sized storage containers. As clearly noticeable in FIG. 8, different size grid cells 228, 230 are provided by a first portion 224 of the track system and a second portion 226 of the track system 214. The first portion 224 of the track system comprises a first set 218 of parallel tracks extending in the first direction (X-direction) and second 220 and third 222 sets of parallel tracks extending in the second direction (Y-direction). For the purpose of consistency and explanation, the first and second direction are represented by Cartesian axes in a 2 dimensional horizontal plane, where the first direction is along the X-axis and the second direction is along the Y-axis. The first, second and third sets of parallel tracks 218, 220, 222 are arranged in a grid pattern to define a first set of grid cells 228, whereby each grid cell of the first set of grid cells has a dimension extending in the first direction and a dimension extending in the second direction to define a first type grid cell opening. The third set of parallel tracks 222 in the second direction are positioned parallel to and between the second set of parallel tracks 220 in the first portion 224 of the track system, so that the first type grid cell opening 54*b* is smaller and therefore accommodates the smaller, first type storage containers.

The second portion 226 of the track system comprises a combination of the first set of grid cells 228 and a second set of grid cells 230. Unlike the first set of grid cells 228, the second set of grid cells 230 are defined by only the first 218 and the second 220 sets of parallel tracks, whereby each grid cell 230 of the second set of grid set of grid cells has a dimension extending in the first direction and a dimension extending in the second direction to define a second type grid cell opening 54*c*. The third set of parallel tracks 220 divides the second type grid cell openings 54*c* to create the first set of grid cells 228. In the particular embodiment of the present invention shown in FIG. 8, the third set of parallel tracks 220 bisects the second type grid cell openings 54*c* to create two first set of grid cells 228 per second type grid cell opening 54*c*. The absence of the third set 222 of parallel track results in the second type grid opening 54*c* being a multiple of the first type grid opening 54*b* and therefore able to accommodate larger, second type storage containers.

Figure 10:
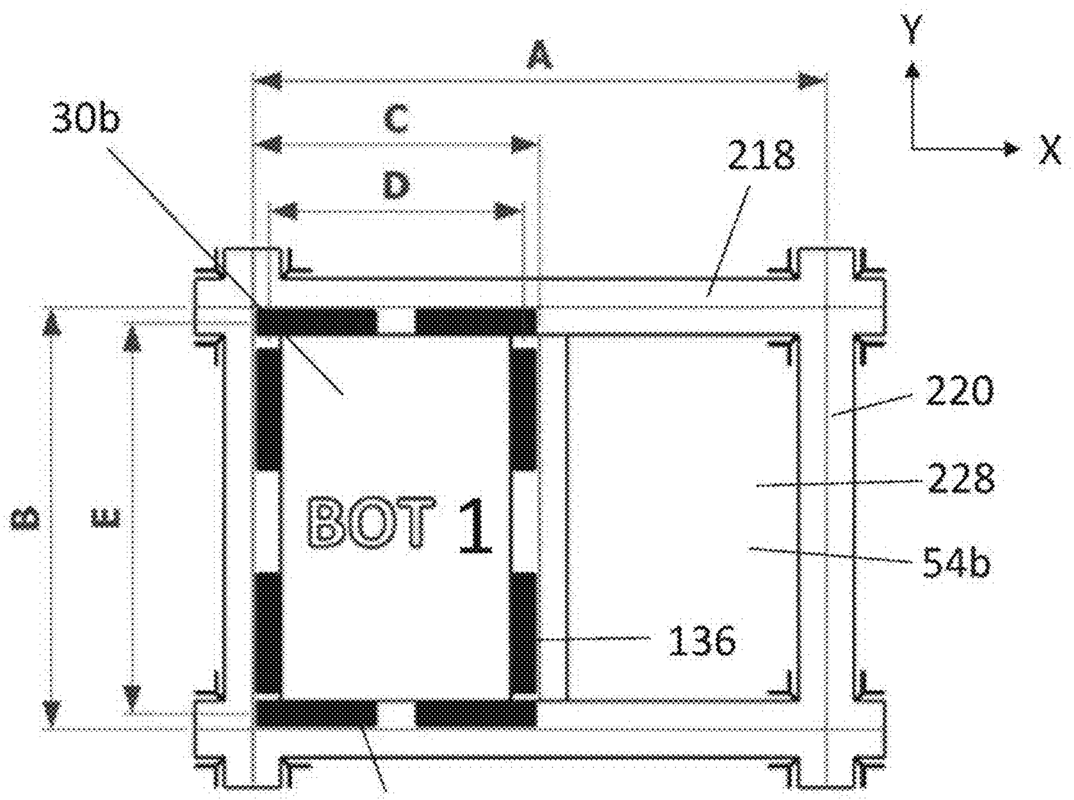
FIG. 10 is a schematic view showing the relationship of (a) the first 'smaller' type robotic load handling device with the larger second type grid cell opening; and (b) the second 'larger' type robotic load handling device with the larger second type grid cell opening.
Figure 10:
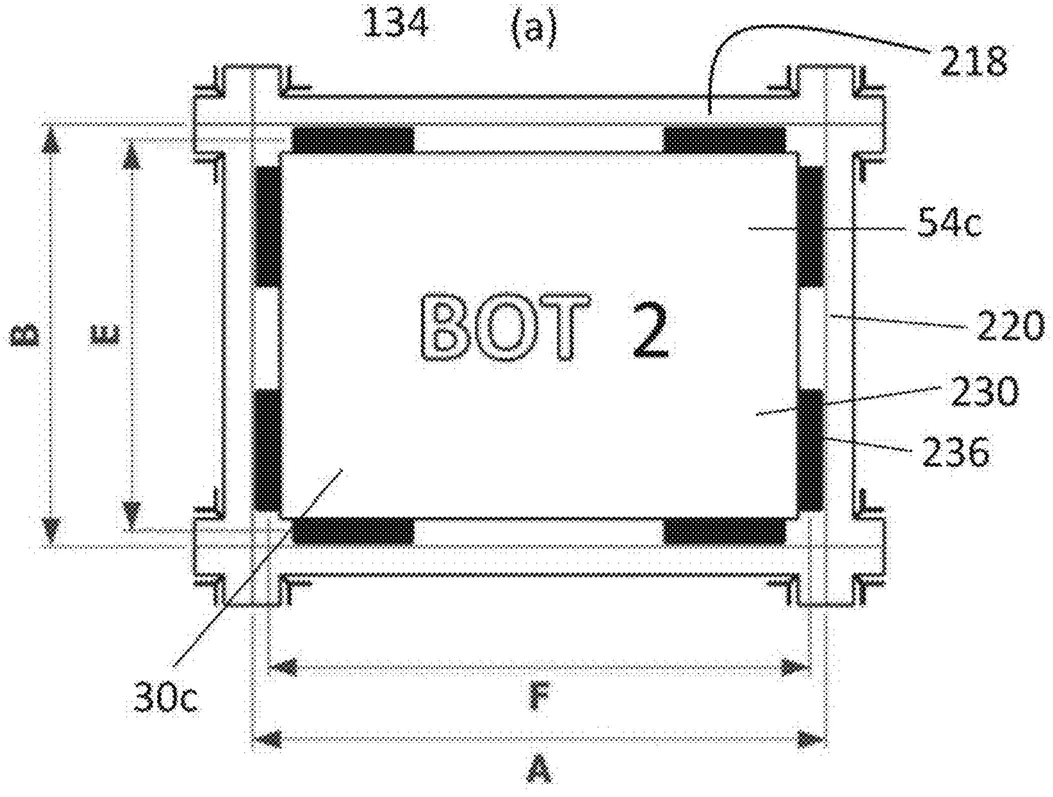

In order for a robotic load handling device having a wheel assembly with a different footprint to move across both the first 54*b* and the second 54*c* type of grid openings, the dimension in one direction of the first and second type of grid openings are substantially equal. More specifically, in the first direction, the dimension of the second type grid cell opening 54*c* is a multiple of the dimension of the first type grid opening 54*b* and in the second direction, the dimension of the first type grid opening is substantially equal to the dimension of the second type grid opening. The wheel assembly of a robotic load handling device is tailored so that the separation of sets of pairs of wheels are able to engage with the first, second and third sets of parallel tracks when moving in the first and the second direction. This can be explained with reference to FIG. 10(*a* and *b*). FIG. 10*a* shows two grid cells of the first type 228 and FIG. 10*b* shows a single grid cell of the second type 230. In the FIG. 10*a*, the grid cell is shown divided by a track element which forms part of the third set of parallel tracks 222. The dimension of the grid cell 54*b* is given by the length denoted by 'B' and the width denoted by 'C.' in FIG. 10*a*. FIG. 10*b* shows a grid cell 54*c* of the 'larger' second set of grid cells formed by the first 218 and second sets of parallel tracks. The dimension of the grid cell 54*c* is given by the length denoted by 'A' and the width denoted by 'B' in FIG. 10*b*. In the particular embodiment of the present invention shown in FIG. 10(*a* and *b*), the third set of parallel tracks is shown bisecting the larger second type of grid cell 54*c* having a length denoted by 'A' to create two smaller first type grid cells 54*b*, each having a width denoted by 'C' that is substantially half that of the length 'A'. For different robotic load handling devices having differing wheel assembly footprints to move across both the first and second sets 54*b*, 54*c* of grid cells, at least one dimension of the grid cells is substantially equal. It is clearly apparent in FIG. 10 (a and b), the dimension denoted by the letter 'B' extending in the second direction (Y-direction) of grid cell types, 54*b*, 54*c* is substantially equal.

The wheel assembly of a robotic load handling device can be described with respect to the wheel base and track width as shown in FIG. 10(*a* and *b*). The wheel base is defined as the distance between the centres of the front and rear wheels of a vehicle. Since the wheel assembly of a robotic load handling device comprises a first set of wheels for engaging with the tracks to move in the first direction and a second set of wheels for engaging with the tracks to move in the second direction, each of the first and second sets of wheels comprises a first and second wheel base. The first wheel base represents the distance between the centre of the front and rear wheels of the first set of wheels and the second wheel base represents the distance between the centre of the front and rear wheels of the second set of wheels.

For a wheel assembly having a different wheel base to move on the tracks so as to straddle across the first type (small) 54*b* and the second type (large) grid 54*c* openings, the track width of the wheel assembly is an important aspect of the wheel assembly. The track width, as demonstrated in FIG. 10 (a and b), refers to the distance between the centreline of two wheels of either the first set or the second set of wheels sharing the same axis of rotation, e.g. on a same 'imaginary' axle. For a wheel assembly comprising first and second sets of wheels, each of the first and second sets of wheels respectively comprises a first track width and a second track width. The first track width enables the robotic load handling device to move in the first direction on the track system and the second track width enables the robotic load handling device to move in the second direction on the track system. In the particular embodiment shown in FIG. 10(*a* and *b*), two types of robotic load handling devices 30*b*, 30*c* are shown operable on the track system, namely a first type 'small' robotic load handling device 30*b* and a second type 'large' robotic load handling device 30*c*. For ease of explanation, the first robotic load handling device 30*b* can be referred to as the "small" robotic load handling device and the second type robotic load handling device 30*c* can be referred to as the "large" robotic load handling device. In order for both the small 30*b* and large 30*c* robotic load handling devices to straddle across the small, first type grid opening 54*b* and the larger, second type grid opening 54*c*, it is necessary that one of the track widths of the small 30*b* and large 30*c* robotic load handling devices are substantially equal. As the dimension 'B' of the first and second type grid opening in the second (Y) direction are substantially equal, then in order for the small 30*b* and large 30*c* robotic load handling devices to straddle across both the first 54*b* and second 54*c* type of grid openings, the first sets of wheels 134, 234 of both the small and large robotic load handling devices are arranged to have a substantially equal first track width. In the schematic drawing shown in FIG. 10(*a* and *b*), the first set of wheels 134 of the small, first type robotic load handling device 30*b* has a track width denoted by the letter 'E' in FIG. 10*a* being substantially equal to the track width of the first set of wheels 234 of the larger, second type robotic load handling device denoted by the letter 'E' in FIG. 10*b*. However, the track width of the second set of wheels 236 of the larger, second type robotic load handling device denoted by the letter 'F' in FIG. 10*b* is a multiple of the track width denoted by the letter 'D' of the second set of wheels 136 of the smaller, first type robotic load handling device in FIG. 10*a*. Thus, the second type robotic load handling device is able to accommodate a larger storage container.

To accommodate a larger (second) type storage container in the track system, the second track width 'F' of the second set of wheels 236 of the large robotic load handling device is a multiple of the second track width 'D' of the second set of wheels 136 of the small robotic load handling device. The differences in dimension of the first and second track widths of the wheel assemblies of the small and large robotic load handling device is shown in FIG. 10 (a and b). In the particular embodiment shown in FIG. 10*b*, the second track width 'F' of the wheel assembly of the larger second type robotic load handling device is twice as long as the second track width 'D' of the wheel assembly of the smaller first type robotic load handling device. However, the present invention is not limited to the second track width of the wheel assembly of the larger second type robotic load handling device being twice as long as the second track width of the wheel assembly of the smaller first type robotic load handling device, and can be any multiple of the second width in the ratio X:1 where X could be any positive integer e.g. 4. The key to allowing the smaller first type robotic load handling device to move across the larger second set of grid cells in the second portion of the track system is that the first track width 'E' of the smaller robotic load handling device is substantially equal to the first track width 'E' of the larger robotic load handling device. Thus, the smaller first set of grid cells 54*b* in the second portion 226 of the track system 214 can be envisaged to be an entry point for the smaller first type robotic load handling device 30*b* to enter the second portion 226 of the track system and access the larger second type grid cell opening 54*c*. As the first and second track widths of the larger second type robotic load handling device are able to move along the first and second sets of parallel tracks, the larger second type of robotic load handling device is able to move in both the first and second direction in any portion of the track system.

Figure 8B:
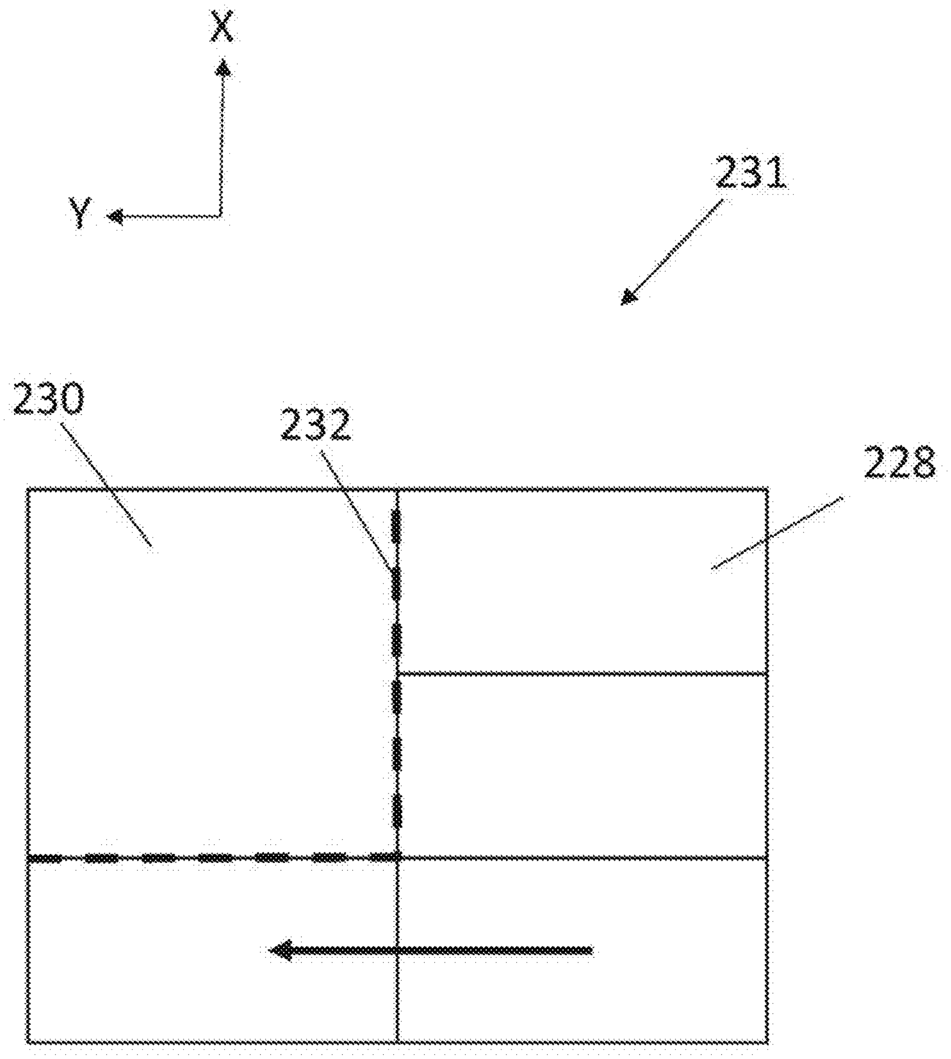
FIG. 8*b* is a schematic representation of the entry point for the first 'smaller' type robotic load handling device in a second portion of the track system shown in FIG. 8.

In operation, the smaller first type of robotic load handling device 30*b* is able to enter the second portion 226 of the track system via the smaller first type grid cell 228 in one direction, i.e. the second direction, such that its wheel assembly is able to straddle across the large second type grid opening 54*c*. In other words, the track width of its wheel assembly extends across the width of the larger second type grid cell 230. In the particular embodiment shown in FIGS. 8 and 10, the first track width 'E' of its wheel assembly extends across the dimension in the second direction of the larger second type grid cell 230. The smaller first type robotic load handling device 30*b* is then able to move across the larger second type grid cells 230 in a direction substantially perpendicular to the direction in which the first type robotic load handling device entered the second portion 226 of the track system. To enable the smaller first type robotic load handling device 30*b* enter the second portion 226 of the track system, one or more of the larger second set of the grid cells 230 is neighboured by multiple grid cells of the first type of grid cells 228 in the first direction and a single grid cell of the first type of grid cell in the second direction. This is exemplified by the portion 231 of the track system encircled in FIG. 8 and an enlarged view of the encircled portion 231 in FIG. 8*b*. As is clearly shown in FIG. 8*b*, the grid cell of the 'larger' second set of grid cells 230 is partially bound or neighboured by two grid cells of the 'smaller' first set of grid cells 228 in one direction (X-direction) and one grid cell of the 'smaller' first set of grid cells in the other direction (Y-direction). The boundary 232 between the 'larger' second set of grid cells and the 'smaller' first set of grid cells is shown by the dashed line 232 in FIG. 8*b*. The boundary 232 provides an area of the track system where the 'larger' second set of grid cells is conterminous with the 'smaller' first set of grid cells. In FIG. 8*b*, one or more of the 'larger' second set of grid cells is conterminous with multiple grid cells of the first set of grid cells in the first direction (X-direction) and a single grid cell of the first set of grid cells in the second direction (Y direction). This allows the 'smaller' first type robotic load handling device to enter the second portion of the track system in one direction (e.g. Y-direction) shown by the arrow in FIG. 8*b* and move across the larger grid cell of the second set of grid cells in an orthogonal direction (e.g. X-direction) shown by the arrow in FIG. 8*b*. The one or more of the 'larger' grid cells is conterminous with multiple grid cells of the first set of grid cells in the first direction by the arrangement of the first portion of the track system comprising the grid cells of the first set of grid cells being adjacent the second portion of the track system comprising the grid cells of the first and second set of grid cells.

Figure 11:
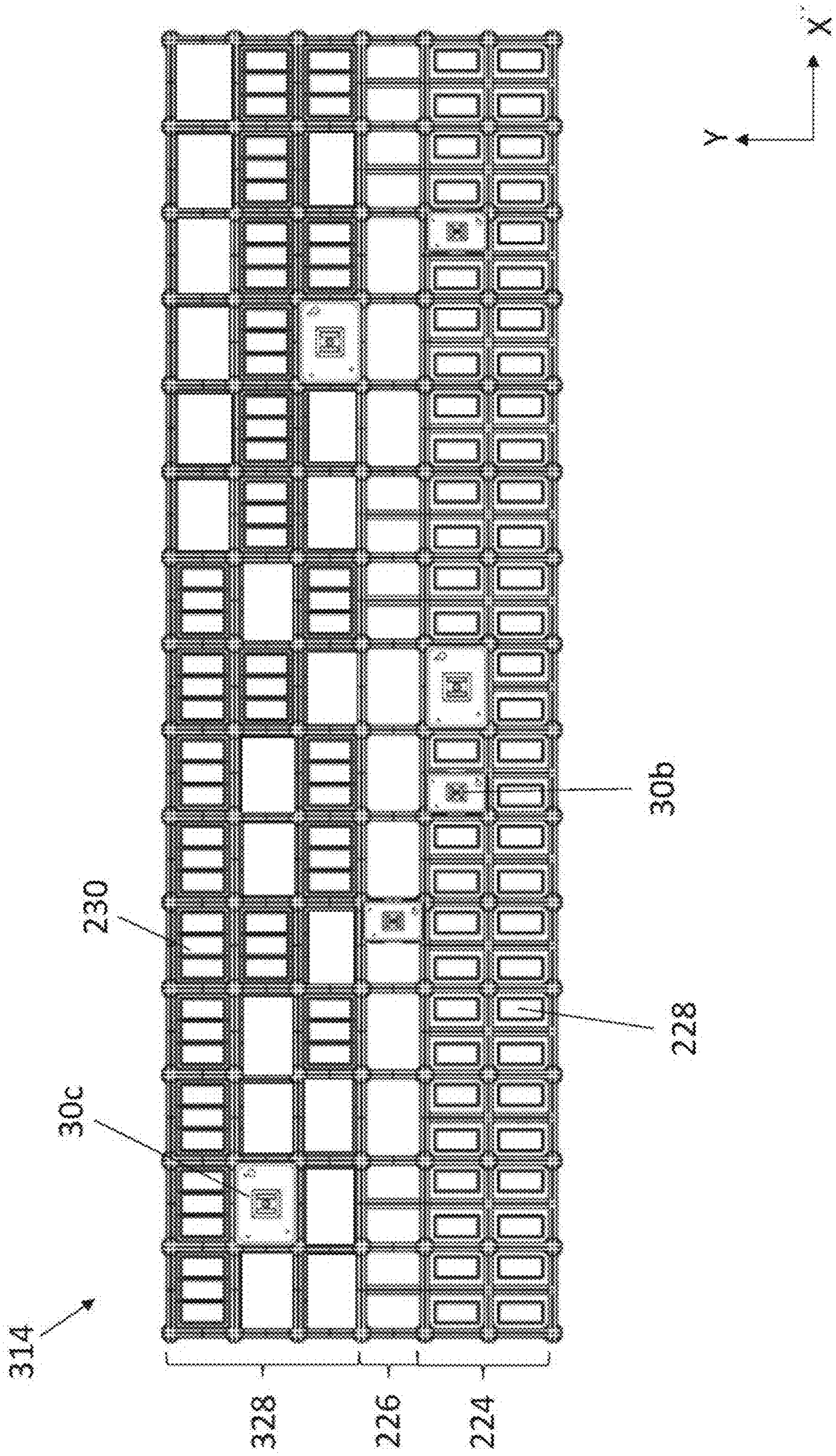
FIG. 11 is a schematic representation of a top plan view of the track system according to another embodiment of the present invention.

Since the first type robotic load handling device entered the second portion of the track system in a second direction, then it is able to move across the larger second type grid cell in the first direction. The movement of the first type robotic load handling device from the first portion 224 of the track system 214 into the second portion 226 of the track system and across the larger second type grid cells 230 is demonstrated by the dashed arrows shown in FIG. 8 and more clearly in FIG. 9*a*. By positioning the wheel assembly of the smaller, first type robotic load handling device across the width of the larger, second type grid cell 230, the smaller, first type robotic load handling device is able to move across the larger, second type grid cell 230. Whilst the particular embodiment shown in FIG. 8 show the track system 214 comprising a first portion 224 comprising the smaller, first set of grid cells 228 and a second portion 226 comprising a mixture of the smaller, first set of grid cells 228 and larger, second set of grid cells 230, the track system 314 according to the present invention is not limited to just two portions and can comprises a plurality of portions, each of the plurality of portions comprising a different size grid cell opening. In the particular embodiment shown in FIG. 11, the track system 314 comprises an additional third portion 328 consisting of the larger second set of grid cells 230 adjacent the second portion 226 of the track system 314 such that the second portion 226 of the track system, comprising a combination of the first 228 and second 230 sets of grid cells, forms an interface zone between the first 224 and third 328 portions of the track system 314. The second set of larger grid cells 230 in the third portion 328 is able to accommodate the larger second type storage containers. Also shown in the third portion 328 is that one or more of the larger, second type grid cells 230 are able to accommodate the smaller, first type of storage containers. Here, the smaller, first type of storage containers are nested within the larger, second type of storage containers. Further detail of the nesting of the smaller, first type storage containers in the larger, second type storage containers is discussed below.

Figure 12:
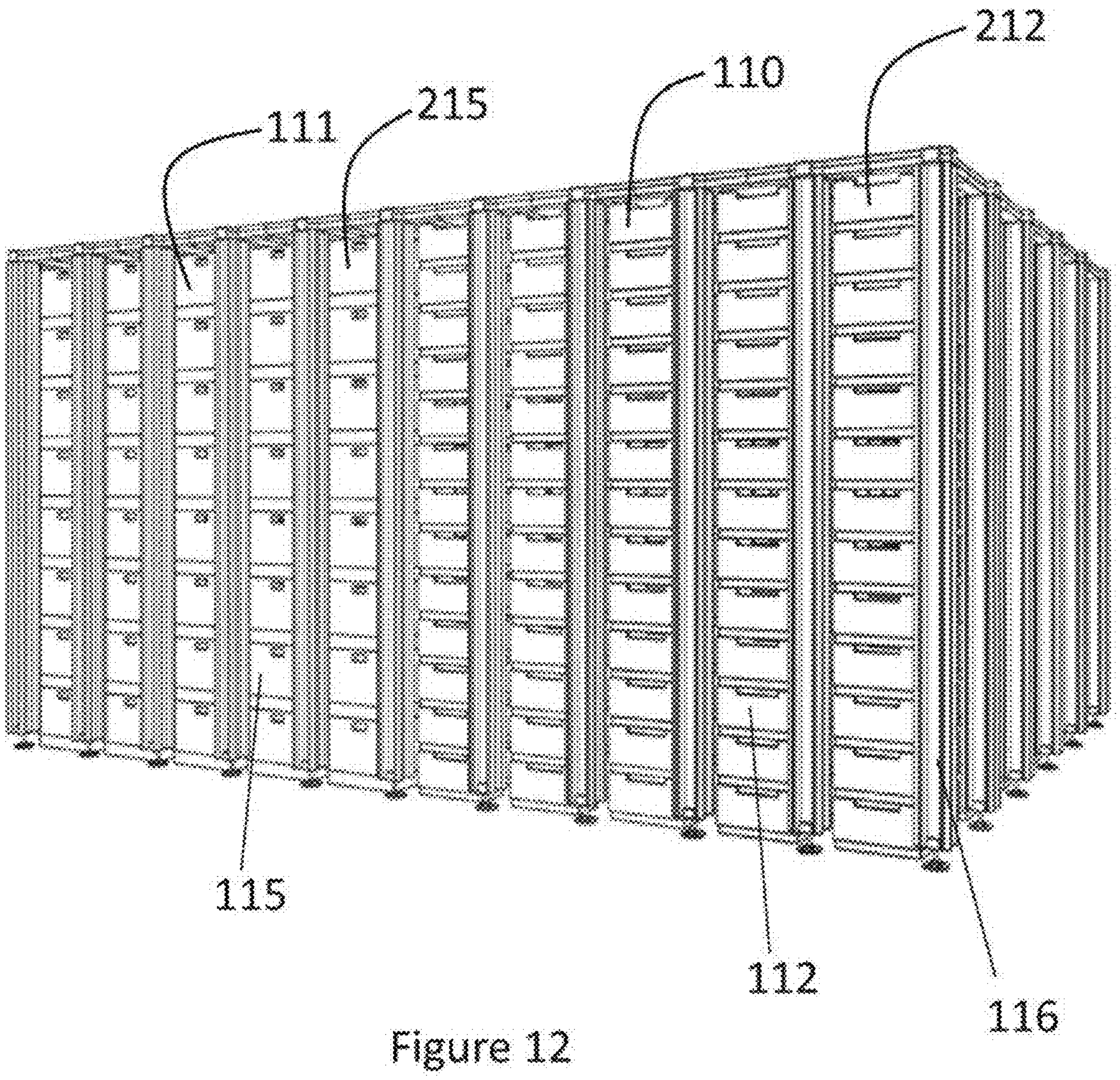
FIG. 12 is a schematic representation of the arrangement of the first type and second type storage columns below the track system shown in FIG. 8.

One or more stacks of the different sized storage containers (e.g. first and second type) are arranged below their respective grid cell openings (first and second type) in the first, second and optionally, the third portion of the track system so that the first type and the second robotic load handling devices operative on the track system can drop off and/or pick up a storage container from a stack (see FIG. 12). The track system is raised above ground level by being mounted to the plurality of upright columns 116 at the intersections or nodes where the grid members cross so as to form a plurality of vertical storage locations for the storage containers to be stacked between the upright columns 116 and be guided by the upright columns 116 in a vertical direction through the plurality of substantially rectangular grid cell openings. A stack of storage containers 112, 115 can encompass a plurality of containers or one or more storage containers. For the purpose of definition of the stacks of different sized storage containers, the stack of the smaller, first type storage containers is termed a first type stack of storage containers 112 and the stack of the larger, second type storage containers is termed a second type stack of storage containers 115. The first type stack of storage containers 112 are stored in a first type vertical storage column 212 located vertically below the first type grid opening so that the first type storage container can be lifted along the first type vertical storage location 212 and through the first type grid opening. Similarly, the second type stack of storage containers 115 are stored in a second type vertical storage column 215 located vertically below the second type grid opening so that the first type storage container can be lifted along the second type vertical storage location and through the second type grid opening. Multiple first and second type vertical storage locations are located below their respective first type and second type grid openings in the first, second and optionally, third portion of the track system. This is demonstrated in FIG. 12 showing the different types of storage containers 110, 111 stacked in their respective vertical storage columns 212, 215.

Figure 9A:
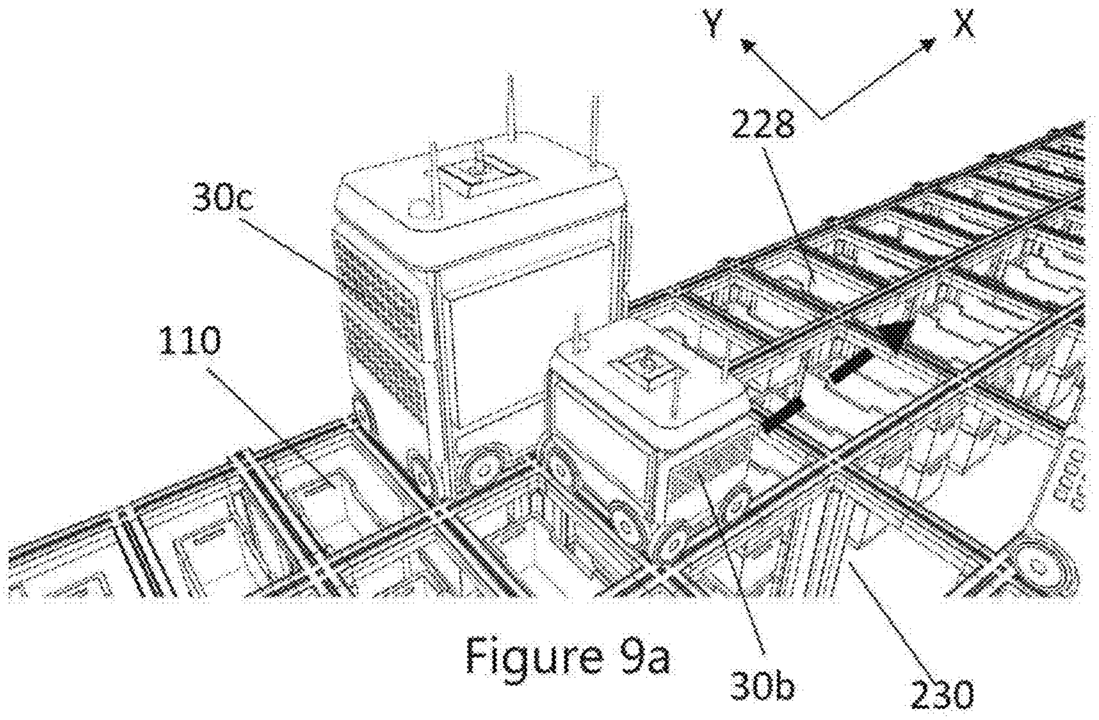
FIG. 9*a* is an enlarged view of the track system shown in FIG. 8 showing the first 'smaller' type and second 'larger' type robotic load handling device operative on the track system.
Figure 9B:
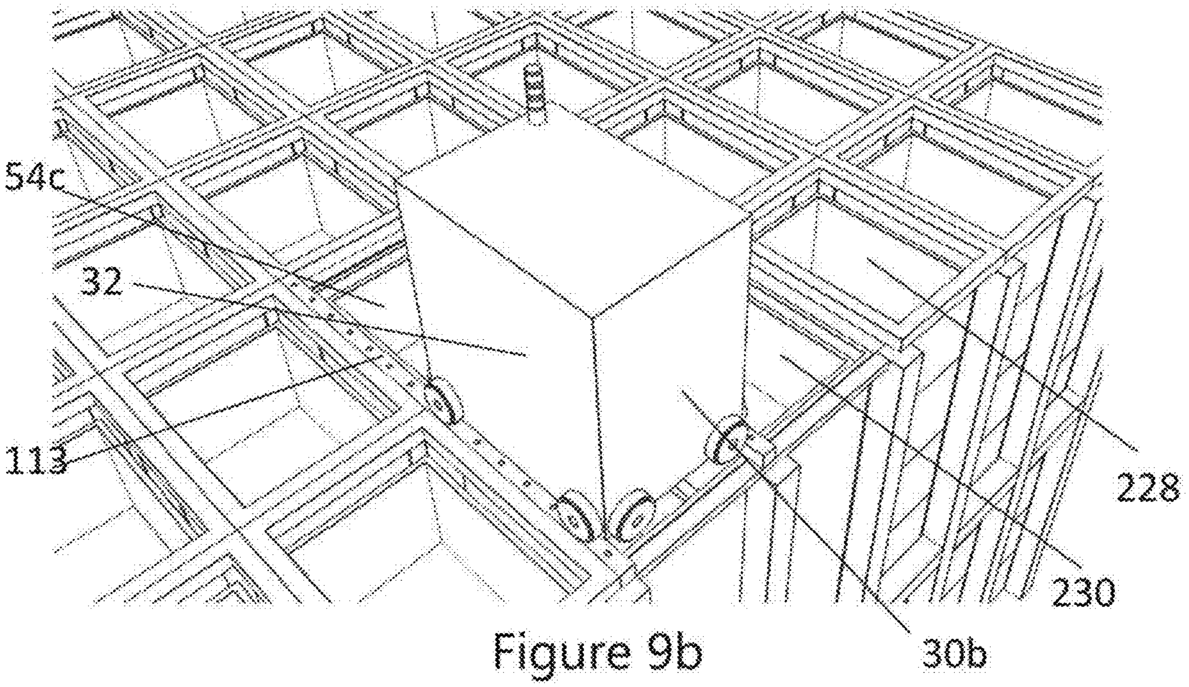
FIG. 9*b* is a schematic representation of the smaller, robotic load handling device positioning itself over the larger grid cell in order to position its grabber device into engagement with a smaller, storage container nested within a larger storage container.

To enable the smaller, first type robotic load handling device 30*b* to lift items from the larger, second type storage container when straddled over the second (larger) type grid cell opening 54*c*, two or more of the smaller, first type storage containers 110 can be nested within the larger, second type storage container (see FIG. 9*a*). In order for the smaller, first type robotic load handling device 30*b* to position itself over the smaller, first type storage containers, one or more position sensors (not shown) can be mounted to the body of the smaller, first type robotic load handling devices. The position sensor can interact with the track so as to position the smaller, first type robotic load handling device (30*b*) over the larger, grid cell opening 54*c* such that its grabber device is able to engage with a smaller storage container nested with the larger storage container. The position sensor can be based on a light sensor which interacts with markings 113 on the track as shown in FIG. 9*b*. Here, at least one track comprises markings 113 that are equally spaced which interact with the position sensor mounted to the vehicle body 32 of the smaller, first type robotic load handling device 30*b*. The markings 113 enables the smaller, first type robotic load handling device to position itself accurately over the larger grid cell opening such that its grabber device is able to engage with the correct smaller, storage container nested within the larger, storage container. The marking 113 are primarily along the tracks extending in the second direction of the larger grid cell openings in the second portion of the track system comprising a mixture of the smaller, first set of grid cells 228 and larger, second set of grid cells 230. This allows the smaller, first type robotic load handling devices to straddle over the larger grid cells 230 in the second portion of the track system and position itself over a smaller storage container nested 110*a*, 110*b* within the larger storage container 111 so as to enable its grabber device to engage and lift the smaller storage container 110*a*, 110*b* from the grid cell.

Figure 13:
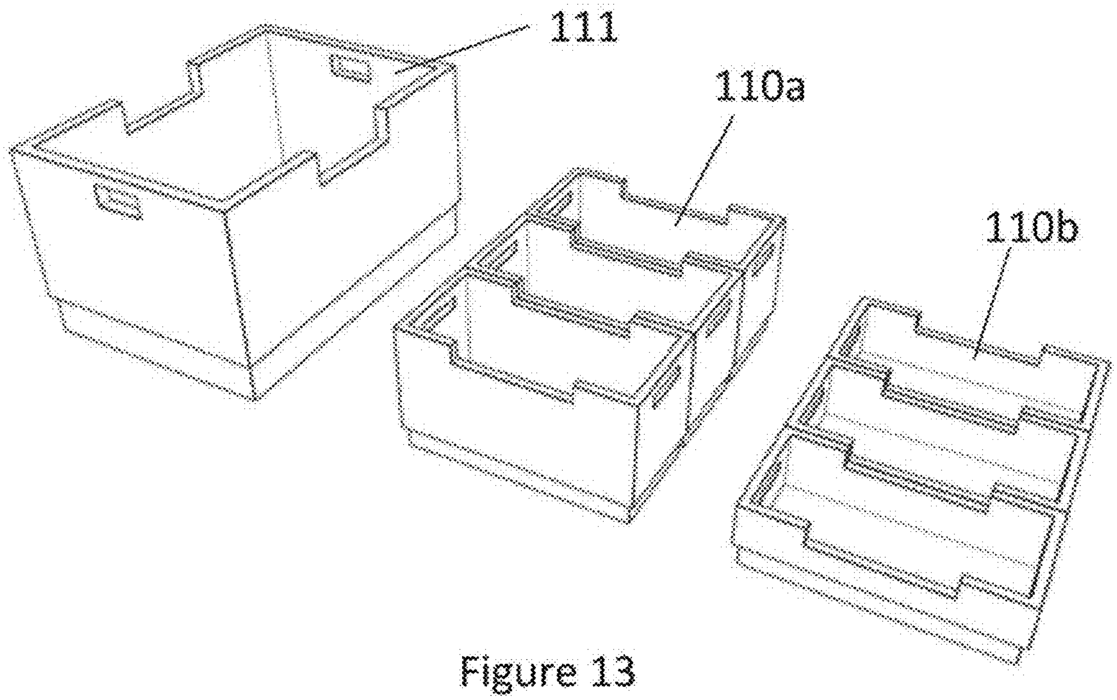
FIG. 13 is a schematic representation of the different sizes of storage containers suitable to be accommodated in the first and second type storage columns in FIG. 12.
Figure 14:
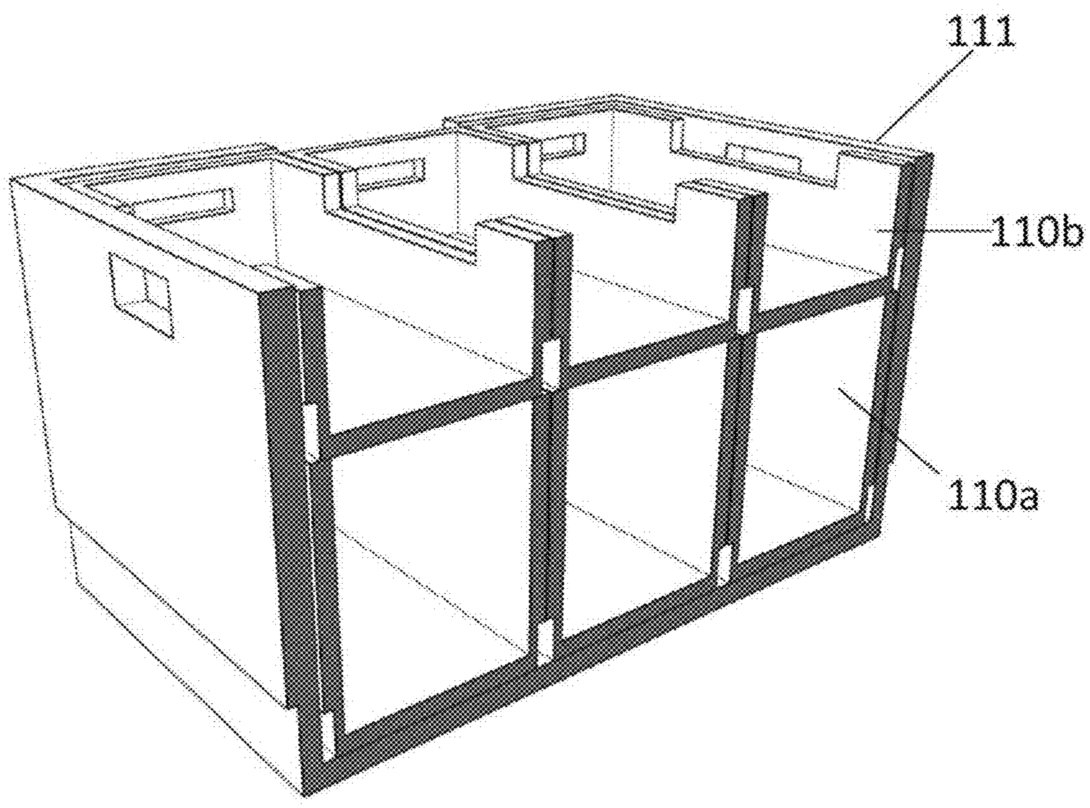
FIG. 14 is a cross-sectional view of the first type 'smaller' storage containers nested within a second type 'larger' storage container.

There are different arrangements of the smaller, first type storage containers that can be nested in the larger, second type storage container as demonstrated in FIGS. 13 and 14. Two or more of the smaller, first type storage containers 110*a*, 110*b* can be nested side-by-side in the larger, second type storage container 111. In the particular embodiment shown in FIG. 14, three of the first-type storage containers 110*a* can be nested side-by-side in the larger, second type storage container 111. The depth or height of the first-type storage containers 110*a*, 110*b* can be reduced so that more than one layer of first-type storage containers 110*b* can be nested within the larger, second type storage container 111. For example, two layers of a set of three of the smaller, first type storage containers can be nested within the larger, second type storage containers to provide a total of six of the smaller, first type storage container nested in the larger, second type storage container. This is demonstrated in the arrangement of the smaller storage containers 110*a*, 110*b* nested in the larger storage container 111 in FIG. 14. Equally, three layers of a set of three of the smaller bins 110*a*, 110*b* can be nested within the larger storage containers 111 to provide a total of nine of the smaller storage container nested in the larger storage container 111. Each of the smaller storage containers 110*a*, 110*b* nested within the larger storage container 111 can individually store items of a different SKU. For example, multiple SKUs can be separately stored in the larger storage container by being divided into the separate smaller storage containers 110*a*, 110*b* nested within the larger storage containers. The cross-sectional areas of the smaller and the larger storage containers are sized so that they can picked up by the first type 30*b* and the second type robotic load handling device 30*c* respectively. In order for the first type 30*b* and the second type robotic load handling devices 30*c* operable on the track system to pick up the smaller 110*a*, 110*c* and the larger storage containers 111, the lifting mechanisms of the first type robotic load handling device 30*b* and the second type robotic load handling device 30*c* comprise a grabber device that is sized to engage with the respective smaller 110*a*, 110*b* and the larger storage containers 111. For example, the frame of grabber device of the first type robotic load handling device 30*b* is sized to engage with the smaller storage container 110*a*, 110*b*. Equally, the frame of the grabber device of the second type robotic load handling device 30*c* is sized to engage with the larger storage container 111. In the particular embodiment of the present invention shown in FIG. 9*a*, the vehicle body of the first 30*b* and second 30*c* type robotic load handling devices houses the lifting device comprising the lifting drive assembly and the grabber device such that the grabber device is configured, in use, to releasably grip the respective smaller 110*a*, 110*b* or the larger storage container 111 and lift the storage container 110*a*, 110*b*, 111 from a stack in the grid framework structure into a container receiving space. The container receiving space of the first type 30*b* and/or the second type robotic load handling device 30*c* may comprise a cavity or recess arranged within the vehicle body, e.g. as described in WO 2015/019055 (Ocado Innovation Limited). Alternatively, the vehicle body of the first type and/or the second type robotic load handling device may comprise a cantilever as taught in WO2019/238702 (Autostore Technology AS) in which case the container receiving space is located below a cantilever of their respective first or second type of robotic load handing device. In this case, the grabber device is hoisted by a cantilever such that the grabber device is able to engage and lift a storage container from a stack into a container receiving space below the cantilever.

The ability to nest the smaller storage containers 110*a*, 110*b* in the larger storage containers 111 increase the flexibility by which the grid framework structure can store items of varying sizes, as the larger storage containers 111 can be used to accommodate the smaller storage containers 110*a*, 110*b*. For example, one or more of the larger storage containers 111 in the larger, second type storage columns 215 in the grid framework structure shown in FIG. 12 can be used to accommodate the smaller storage containers 110*a*, 110*b*. In order to gain access to the contents in the smaller storage containers 110*a*, 110*b* nested in the larger storage containers 111, the larger bots 30*c* can move the larger storage containers 111 to the second portion 226 of the track system 214, 314 comprising the combination of the smaller 228 and larger grid cells 230. Since the track width of the wheel assembly of the larger bot corresponds to the dimensions of the grid cells extending in the first and second direction, the larger bot can move across both the smaller, first type grid cell openings 54*b* and the larger, second type grid cell openings 54*c* in both the first and second direction in the second portion 226 of the track system 214, 314. As a result, the larger bot 30*c* can deposit the large bin 111 comprising the nested smaller bins 110*a*, 110*b* through the larger, second type grid openings 54*c* in the second portion 226 of the track system 214, 314. One or more of the large bins 111 can be stacked in the larger, second type storage columns 215 below the larger grid cells 230 in the second portion 226 of the track system 214, 314. As the second portion 226 of the track system 214, 314 comprises a mixture of the smaller 228 and larger grid cells 230, the smaller grid cells 228 provide an entry point for a smaller bot 30*b* to enter into the second portion 226 of the track system 214, 314 and be able to position itself so the track width 'E' of its wheel assembly corresponds to one of the dimensions of the larger grid cells from track to track, i.e. the track width 'E' of the wheel assembly of the smaller bot 30*b* extends across one of the dimensions of the larger grid cell 230. For purpose of the definition of the present invention, the first track width 'E' of the small bot 30*b* corresponds to the dimension of the larger grid cell extending in the second direction. This then allows the smaller bot 30*b* to straddle over the larger grid cell opening 54*c* in a substantially perpendicular direction to the entry of the small bot 30*b* over the smaller grid cell opening 54*b*. When the small bot 30*b* straddles across the large grid opening 54*c* in the second portion 226 of the track system 214, 314, the small bot 30*b* can position itself over the large grid cell opening 54*c* so that its grabber device can engage and pick up a small storage container 110*a*, 110*b* nested within the larger storage container 111. Once lifted into the container receiving space of the small bot 30*b*, the small bot 30*b* can exit the large grid cell and travel across the smaller grid cells 228 towards an inventory handling station assembly. The converse is true, where the small bot 30*b* can deposit a smaller storage container 110*a*, 110*b* into the larger storage container 111 held in a stack in the larger, second type storage columns 215 below the second portion 226 of the track system 214, 314 by lowering the smaller storage container 110*a*, 110*b* through the larger grid cell openings 54*c* in the second portion of the track system and into a larger storage container 111. The larger storage container 111 can remain in the stack in the larger, second type storage column 215 in the second portion 226 of the track system.

Optionally, one or more of the larger storage containers 111 comprising the nested smaller storage containers 110*a*, 110*b* can be moved to a storage location by a large bot 30*c* to the second type storage columns 215 below the third portion 328 of the track system 314. The third portion 328 of the track system 314 comprising largely the large grid cells 230 allows the storage and retrieval system of the present invention to provide a separate storage area for the large storage containers 111. The large storage containers 111 below the third portion 328 of the track system 314 can be used to store large items or can comprise the smaller storage containers 110*a*, 110*b* nested within the larger storage containers 111 for the storage of smaller items. This increases the capacity of the storage and retrieval system of the present invention to store the smaller items should there be a need to extend the storage capacity of smaller items beyond the stacks of storage containers below the first portion 224 of the track system.

Figure 15:
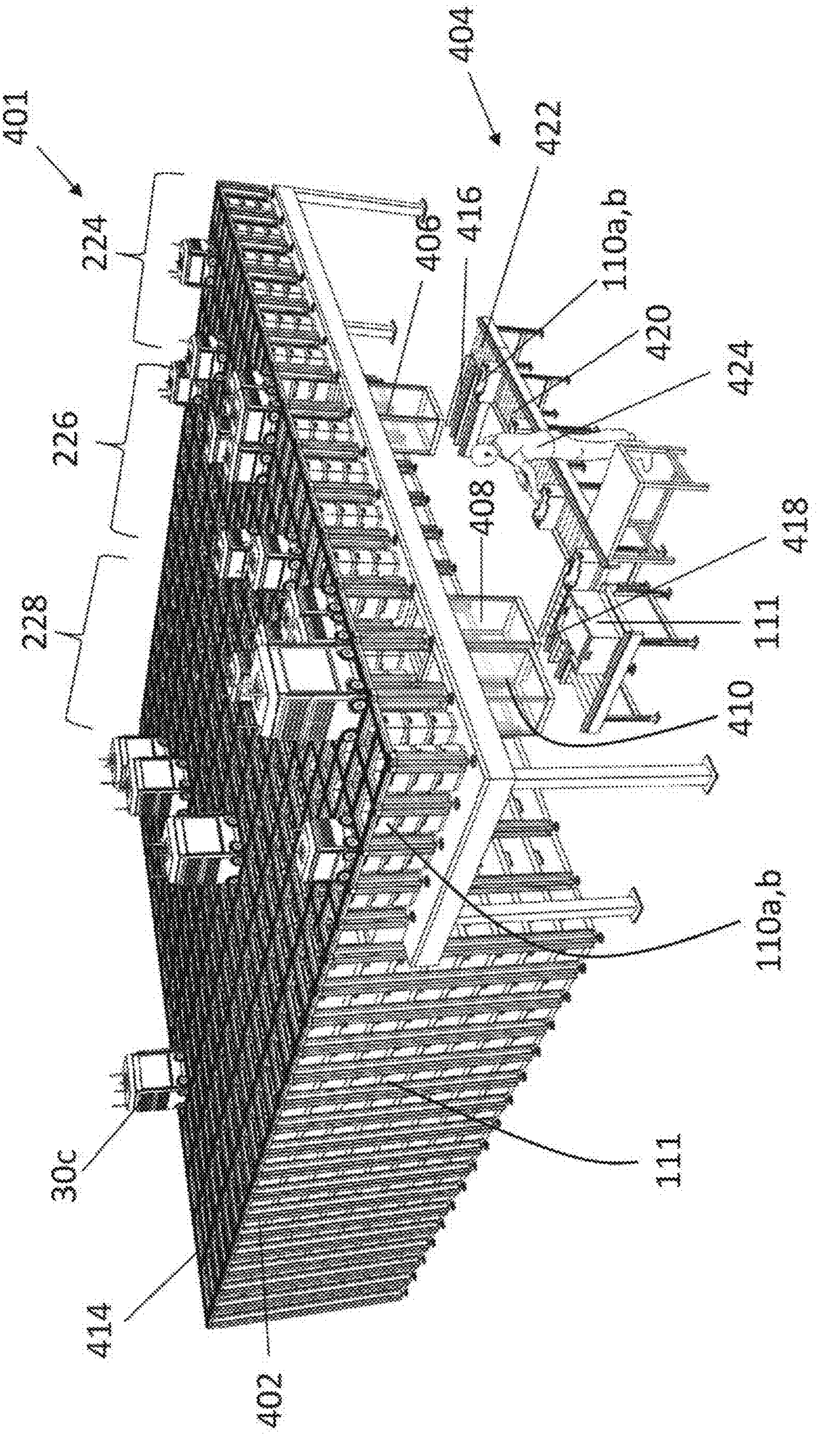
FIG. 15 is a schematic representation of the storage and retrieval system showing the storage containers of the first and second types being ported to an inventory handling station assembly.

A typical layout of a storage and retrieval system 401 comprising a grid framework structure 402 supporting the track system 414 of the present invention is shown in FIG. 15. One or more of the small 30*b* and large bots 30*c* are operable on the track system 414. The smaller bots 30*b* are shown to be operable in the first portion 224 of the track system 414, but can also move in the second portion 226 of the track system 414 as discussed above to pick up the smaller storage containers 110*a*, 110*b*. The larger bots 30*c* due to the footprint of their wheel assemblies are able to travel in all of the portions 224, 226, 328 of the track system 414. Also shown is an inventory handling station assembly 404 at one side of the grid framework structure 402 to receive and/or return small and/or large storage containers 110*a*, 110*b*, 111 into storage in the grid framework structure 402.

A majority of the grid columns in the grid framework structure 402 are storage columns, i.e. grid columns where storage containers are stored in stacks. However, a grid normally has at least one grid column which is used not for storing storage containers, but which comprises a location where the bots can drop off and/or pick up storage containers so that they can be transported to a location (not shown in the prior art figures) where the storage containers can be accessed from outside of the grid framework structure or transferred out of or into the track system. Within the art, such a location is normally referred to as a "port" and the grid column in which the port is located may be referred to as a "port column" through which the storage containers can be transferred between the top level of the track system and the inventory handling station assembly. The grid framework structure can comprise a single port column through which the storage containers can be delivered (dropped off) or retrieved (picked up) from the inventory handling station assembly or alternatively can comprise two port columns. The first port column may for example comprise a dedicated drop-off port where the bots can drop off storage containers to be transported through the first port column and further to an access or a transfer station of the inventory handling station assembly, and the second port column may comprise a dedicated pick-up port where the bots can pick up storage containers that have been transported through the second port column from an access or a transfer station. Storage containers are fed into the access station and exit the access station via the first port column and the second port column respectively. The first and second port column can be separate port columns for the drop off and pick up of storage containers respectively or a single port column for the drop off and pick up of storage containers. In the particular embodiment of the present invention shown in FIG. 15, separate port columns 406, 408, 410 are used for the drop-off and pick-up of storage containers. For ease of explanation of the present invention, the first port column 406 will be termed a "drop-off" port column and the second port column 408 will be termed a "pick-up" port column. The track system 414 of the present invention provides separate drop-off/pick-up ports for the small, first type storage containers and the large, second type storage containers. The drop-off/pick-up port columns can comprise a chute extending between respective drop-off/pick-up ports of the track system to the inventory handling station assembly such that a bot can lower and pick up a storage container through the drop-off or pick-up port column respectively.

Dedicated drop-off/pick-up port columns 406, 408, 410 are provided in the grid framework structure 402 for the smaller storage containers and the larger storage containers. These can be termed a first type port column 406, 408 through which the smaller storage containers can be transferred between the drop-off/pick-up port of the track system and the inventory handling station assembly 404, and a second type port column 410 through which the larger storage containers 111 can be transferred between the drop-off/pick-up port of the track system and the inventory handling station assembly 404. Each of the first type port column 406, 408 and/or the second type port column 410 comprises a drop-off port column through which the first type storage container and/or the second type storage container is lowered to the inventory handling station assembly and a pick-up port column through which the first type and/or second type storage container is picked up towards the track system. These can be separate port columns or a single port column for the drop off and pick up of storage containers. In the particular embodiment of the storage and retrieval system shown in FIG. 15, the first type port column for porting the smaller storage containers comprises a separate drop-off port column 406 and pick-up column 408.

However, the second type port column 410 is a single port column for the drop off and pick up of the larger storage containers 111.

When the contents of a storage container in the grid framework structure are to be accessed, depending on the size of the storage container in storage, the smaller bot or larger bot is instructed to retrieve the target storage container from its position in the grid framework structure. The operation involves moving the relevant bot from its position on the track system to a grid location above the storage column in which the target storage container is positioned, picking up the storage container from its storage column using the bot's lifting device, and moving the storage containers to the drop-off port. The relevant bot depends on whether the target storage container is the smaller storage container, in which case the smaller bot is instructed to retrieve the target storage container, or the large storage container, in which case the larger bot is instructed to retrieve the target storage container. When a storage container is to be stored in the grid framework structure, depending on the size of the storage container, the relevant bot is instructed to pick up the storage container from the pick-up port and move it to a grid location in the track system above a storage column where it is lowered to be stored.

A single inventory handling station assembly 404 or separate inventory handling station assemblies can be provided for handling the smaller storage containers and the larger storage containers that are transferred from the respective drop-off/pick-up port columns of the first type port column 406, 408 and the second type port column 410. Typically, the inventory handling station assembly 404 known in the art comprises a port station or drop-off area 416 which cooperates with the drop-off port column 406 to receive storage containers, a pick-up area 418 which cooperates with the pick-up port column 408 through which storage container can be picked up towards the track system, and an access station 420 where the contents of the storage containers can be accessed. As shown in FIG. 15, the drop-off port column 406 and/or the pick-up port column 408 can be configured as a vertical chute, wherein a lifting device of a robotic load handling device operative on the track system can lower or pick up a storage container through the respective drop-off port column and/or pick-up port column. Alternatively, the drop-off port column and/or the pick-up port column can comprise a bin lift device comprising one or more moveable arms to automatically lower or lift a storage container through the drop-off port column and the pick-up port column respectively. For the purpose of definition, the term 'drop-off area' can sometimes be referred to 'drop-off station' and the term 'pick-up area' can sometimes be referred to 'pick-up station'. As a result, the term 'drop-off station' and 'drop-off area' can be used interchangeably in the patent specification to mean the same feature. Equally, the term 'pick-up area' and 'pick-up station' can be used interchangeably in the patent specification to mean the same feature.

The access station 420 of the inventory handling station assembly 404 of the present invention can double up as a supply station or decant station wherein inventory stored in the grid framework structure is replenished with fresh stock. A conveyor system 422 is configured to convey storage containers from the drop-off area 416 to the pick-up area 418 via the access station 420. The conveyor system 422 is configured such that storage containers are paused at the access station 420 for a predetermined amount of time to enable an operator 424 or a robotic arm to reach into and pick items from the storage containers at the access station 420. The conveyor system 422 can comprise an entry conveyor unit, an exit conveyor unit and at least one access conveyor unit, the entry conveyor unit being arranged in the drop-off area 416 and arranged to transport a storage bin or container dropped off from the drop-off port column 406 in a first transport direction to the at least one access conveyor unit. The exit conveyor unit is arranged in the pick-up area 418 and arranged to transport a storage bin or container from the at least one access conveyor unit to the pick-up area in a second transport direction, and the at least one access conveyor unit is arranged to transport a container from the drop-off area to the pick-up area in a third transport direction. Each conveyor unit may comprise any suitable arrangement of belt(s), chain(s) and/or rollers well known in the art of conveyor systems. Typically, one or more of the rollers of the at least one access conveyor unit and optionally, the entry conveyor unit and/or exit conveyor unit comprises an integrated driving motor (not shown), whilst the remaining rollers may be connected by belts (not shown) to the driving roller, or they may be passive. The entry conveyor unit and the exit conveyor unit are arranged such that the first transport direction of the entry conveyor unit is opposite and parallel to the second transport direction of the exit conveyor unit and wherein the third transport direction of the at least one access conveyor unit is orthogonal to both the first transport direction and the second transport direction of the entry conveyor unit and the exit conveyor unit respectively, i.e. U shaped trajectory (see FIG. 15). Alternatively, the conveyor system may be arranged such that the first transport direction of the entry conveyor unit is substantially orthogonal to both the second transport direction of the exit conveyor unit and the third transport direction of the at least one access conveyor unit. In this aspect of the present invention, the storage containers travel in an L shaped direction from the drop-off area and in a horizontal direction through the access station and subsequently exit the access station into the pick-up area. The three conveyor units provides flexibility in terms of reducing the footprint of the inventory handling station assembly to transport one or more storage bins or containers from the drop-off area to the pick-up area via the access station in multiple transport directions.

However, the rate limiting step of the throughput of storage containers through the storage and retrieval system is the ability of the storage containers to be processed, in the sense that one or more items can be picked or decanted into the storage containers at the access station. Known inventory handling station assemblies in the art suffer from the problem of presenting a limited number of storage containers at the access station. The present applicant has realised that an operator can pick from or decant one or more items into the storage containers much faster than the number of storage containers presented to the operator at the access station shown in FIG. 15. As a result, the access station becomes a bottleneck as the storage containers wait to be processed through the inventory handling station assembly. With the increasing development of automated picking and/or decanting systems such as robotic arms with the ability to pick and/or decant items at a faster rate than a human being, the bottleneck at the access station is becoming an increasing problem. Typically, the pick rate at the access station of known inventory handling station assemblies is around 400 items per hour, and some automated systems can pick in excess of 1000 items per hour. Attempts have been made to speed up the movement of the storage containers through the access station in order to increase the throughput and in some cases a carousel is used to move the storage containers through the access station at a faster rate as taught in the art, WO2018/233886 (Autostore Technology AS). Speeding up the movement of the storage containers through the access station just shifts the problem to the exit station, where one or more storage containers become accumulated waiting to be either lifted towards the track system for subsequent retrieval by a robotic load handling device operative on the track system, or retrieved by a robotic load handling device operative on the track system.

Figure 16:
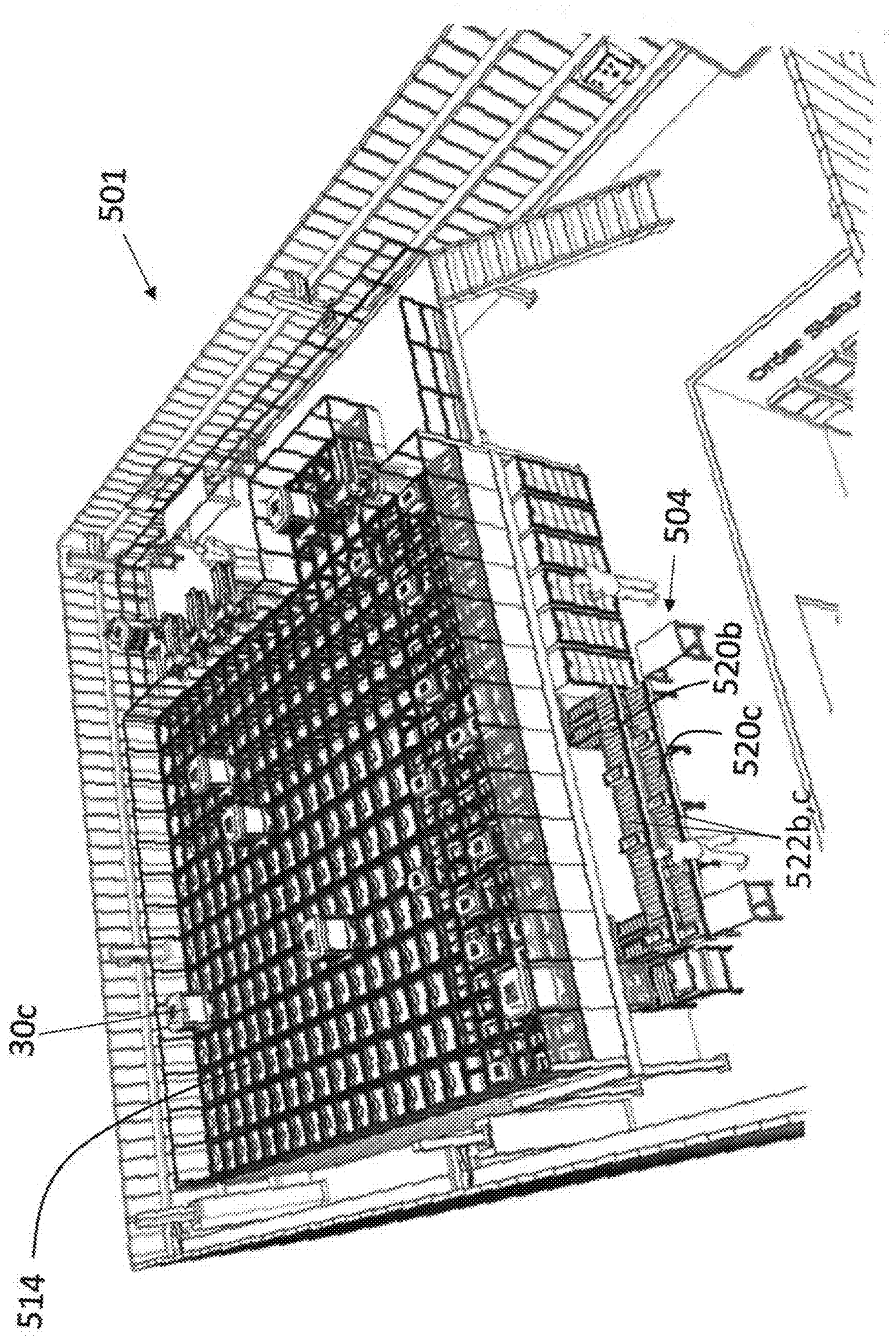
FIG. 16 is a schematic representation of the storage and retrieval system showing the storage containers of the first and second type being ported to an invention handling station comprising multiple access stations at different levels according to an embodiment of the present invention.
Figure 17:
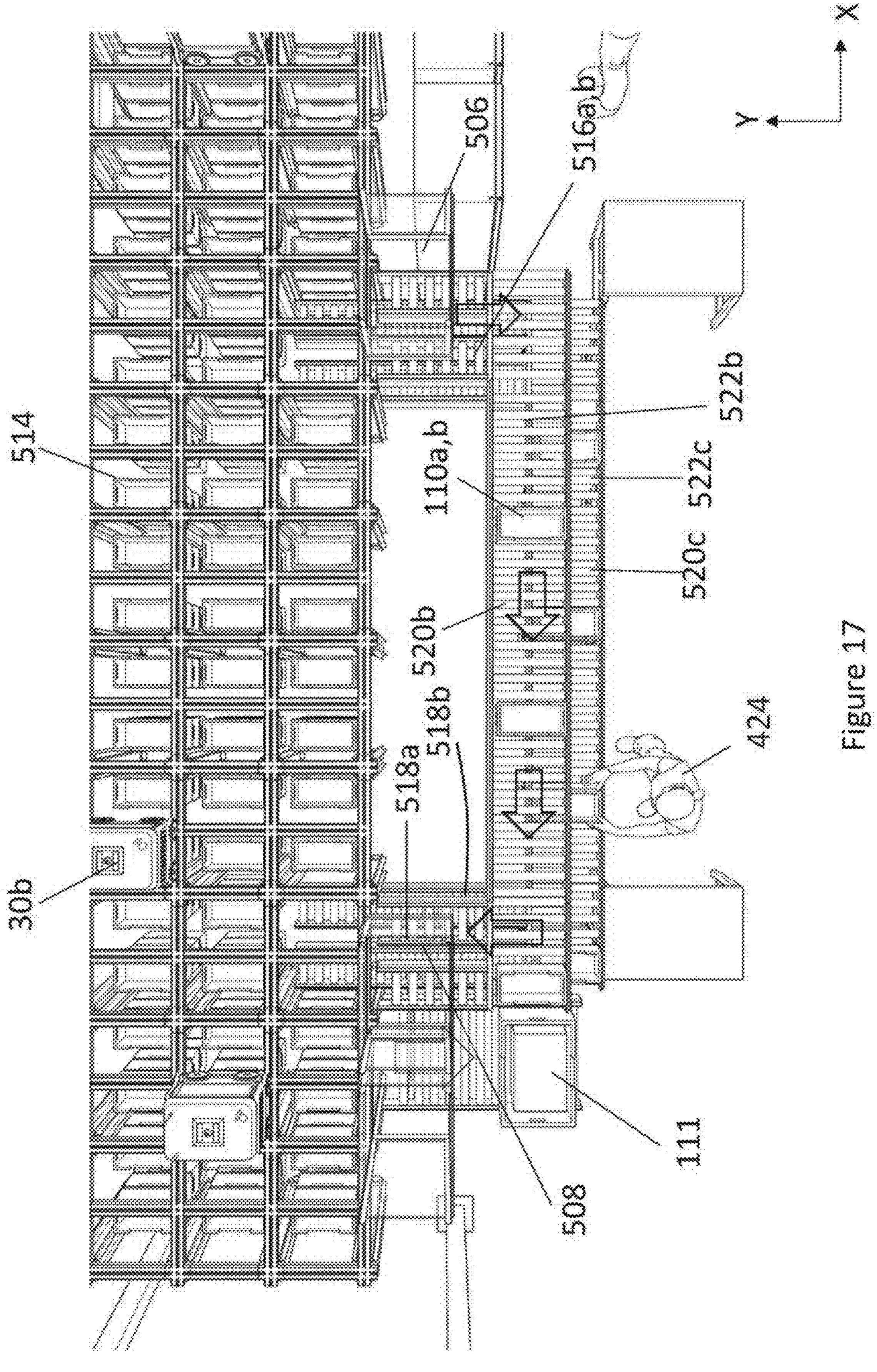
FIG. 17 is a schematic representation of a top plan view of the storage and retrieval system of FIG. 16 showing the grid framework work structure adjacent the inventory handling station assembly.
Figure 19:
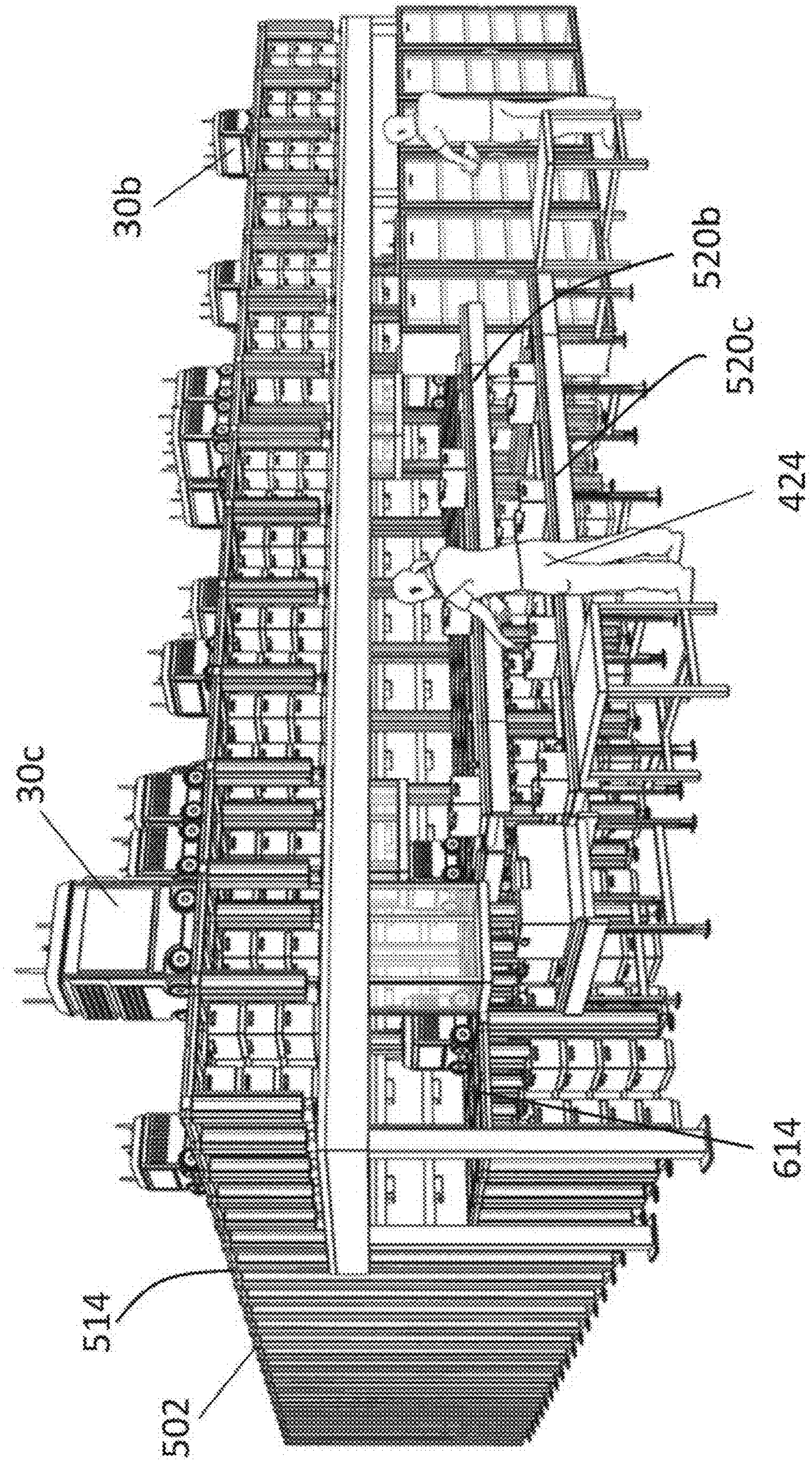
FIG. 19 is a frontal view of the storage and retrieval system of FIG. 18 showing the inventory handling station assembly being ported storage containers from robotic load handling devices operative on the track system.

The present invention has mitigated this problem by providing an inventory handling station assembly 504 wherein the access station 520*b*, 520*c* is formed at two vertically spaced levels, namely a first access station 520*b* at a first level and a second access station 520*c* at a second level, the first level being vertically spaced from the second level (see FIGS. 16 and 17). Having multiple access stations 520*b*, 520*c* at different levels or heights enables multiple storage containers 110*a*, 110*b* to be presented to an operator at any one time without the need to move the storage containers through the access station at a faster rate in order to achieve the desired pick rate. In the particular embodiment of the present invention as shown in FIG. 16 and the top plan view in FIG. 17, the inventory handling station assembly comprises a first access station 520*b* at a first level and a second access station 520*c* at a second level, the first level being at a different height to the second level. The first 520*b* and second 520*c* access stations at the different levels allows more storage containers to be presented to an operator at any one time as shown in FIG. 17. For example as shown in FIG. 19, the first access station 520*b* can be at chest height of an operator at the inventory handling station assembly and the second access station 520*c* can be at waist height so enabling an operator 424 to reach into and pick one or more items from the storage containers at the different levels. Having multiple access stations also allows the storage containers to be paused at the access stations 520*b*, 520*c* for a longer period of time without the need to rush the storage containers through the access station as in the prior art solutions in order to meet the throughput of storage containers through the inventory handling station assembly. The inventory handling station assembly of the present invention is not limited to two access stations at different levels but can comprise any number of access stations at different levels sufficient for an operator or a robotic device to reach into and pick from the storage containers.

To enable an operator or robotic device to reach into the storage containers at the different levels, the first access station 520*b* is laterally displaced or offset from the second access station 520*c* such that the storage containers at the different levels are arranged in a step fashion. The lateral displacement of the storage containers at the first and second access station improves the presentation of the interior space of the storage containers to an operator or robotic device enabling the operator or robotic device to reach into the storage containers at the different levels (see FIG. 17). To conserve space or limit the footprint of the inventory handling station assembly, the first access 520*b* at the first level at least partially overlays the second access station 520*c* at the second level in a step fashion. The first and/or the second access stations can have a slight downward tilt so increasing the presentation of the storage containers at the first and second level.

Also shown in FIG. 17, is that at each level, the inventory handling station assembly comprises a drop-off area 516*a,b* which cooperates with a drop-off port column 506 for dropping off storage containers to the inventory handling station assembly and a pick-up area 518*a,b* which cooperates with a pick-up port column 508 for picking up storage containers from the inventory handling station assembly. For a single level access station, a single drop-off port column can be arranged to drop off storage containers at the drop-off area and a single pick-up port column can be arranged to pick storage containers from the pick-up area. However, in the case where the access station is located at two or more levels as shown in FIGS. 16 and 17, the grid framework structure comprises an upper level port column for transferring storage containers between the track system and the drop-off/pick-up areas at the first level and a lower level port column for transferring storage containers between the track system and the drop-off/pick-up area at the second level. The upper level and lower level port columns can each be a single column for dropping off and picking up storage containers to the respective drop-off and pick-up areas at the different first and second levels. In other words, a single upper level port column may be provided, through which storage containers are dropped off and picked up at the drop-off and pick-up areas at the first level. Similarly, a single lower level port column may be provided, through which storage containers are dropped off and picked up at the drop-off and pick-up areas at the second level. In the particular embodiment shown in FIG. 16, the upper level port column comprises separate drop-off and pick-up port columns through which storage containers are transferred to the drop-off area and the pick-up area respectively at the first level. Similarly, the lower level port column comprises separate drop-off and pick-up port columns through which storage containers are transferred to the drop-off area and the pick-up area respectively at the second level. The separate drop-off port columns and pick-up port columns can be used to drop off and pick up storage containers to and from the access stations at the different levels respectively. For example, a first drop-off port column 506*a* and first pick-up port column 508*a* are used to drop off and pick up storage containers respectively at the first level of the access station 520*b*. Similarly, a second drop-off port column 506*b* and second pick-up port column 508*b* are used to drop off and pick up storage containers respectively at the second level of the access station 520*c*. Each level of the inventory handling station assembly comprises a conveyor system 522*b,c* to convey storage containers from the drop-off area to the pick-up area via the access station. With two levels of the access station, there is a first conveying system 522*b* at the first level and a second conveying system 522*c* at the second level. Like the conveyor system discussed above, the conveyor system at each of the first and second levels comprises an entry conveyor unit at the drop-off area 516*a,b*, an exit conveyor unit at the pick-up area 518*a,b*, and at least one access conveyor unit at the access station 520*b,c*. The direction of travel of the storage containers from the entry conveyor unit to the exit conveyor unit via the at least one access conveyor unit is indicated by the arrows shown in FIG. 17. The entry conveyor units at the different first and second levels of the inventory handling station assembly extend into the grid framework structure so as to cooperate (receive storage containers) with the drop-off columns 506*a*, (first and second drop-off columns) below the track system. Similarly, the exit conveyor units at the different levels of the inventory handling station assembly extends into the grid framework structure so as to cooperate with the pick-up columns 508*a,b* (first and second pick-up columns) below the track system.

To prevent the first drop-off port column 506*a* clashing with the second drop-off port column 506*b* when dropping off a storage container to the drop-off area at the first level, the drop-off area 516*a* at the first level is laterally offset from the drop-off area 516*b* at the second level, i.e. set back from each other. In this way, the first drop-off port column 506*a* is able to cooperate with the drop-off area 516*a* at the first level and the second drop-off port column 506*b* is able to cooperate with the drop-off area 516*b* at the second level. Similarly, the pick-up area 518*a* at the first level is laterally offset from the pick-up area 518*b* at the second level. In this way, the first pick-up port column 508*a* is able to cooperate with the pick-up area 518*a* at the first level and the second pick-up port column 508*b* is able to cooperate with the pick-up area 518*b* at the second level. The first drop-off port column 506*a* and the second drop-off port column 506*b* are then able to feed storage containers to the first and second access stations 516*a,b* at the different levels at a much faster rate than if a single access station is used at one level. Similarly, the first 508*a* and second 508*b* pick-up port columns are able to transfer the storage containers into the grid framework structure so increasing the rate of movement of the storage containers through the first and second access stations at the different levels. However, the present invention is not limited to two access stations as shown in FIG. 17, and the inventory handling station assembly can comprise any number of access stations at different levels or heights that are able to be reached by an operator or a robotic device operating at the inventory handling station assembly. To increase the visibility of the storage containers at the different levels, the access stations 520*b,c* can have a downward tilt, for example at an angle in the region of 10° to 45° to the horizontal. As shown in FIG. 17, the inventory handling station assembly comprises a frame structure supporting the conveyor systems 522*b,c* at the different levels. Each conveyor unit of the conveying system may comprise any suitable arrangement of belt(s), chain(s) and/or rollers well known in the art of conveyor systems. One or more of the rollers of the at least one conveyor unit can comprise an integrated driving motor (not shown), whilst the remaining rollers may be connected by belts (not shown) to the driving roller, or they may be passive.

To locate a storage container buried deep within a stack, it is necessary to instruct a robotic load handling device operative on the track system to remove one or more storage containers above the target storage container so that the target storage container is exposed for a robotic load handling device to lift the target storage container from its storage column. This operation is commonly known in the art as "digging". The operation can be performed by the same robotic load handling device operative on the grid framework structure or a separate robotic load handling device specifically assigned to 'dig" one or more storage containers from the target storage container for a subsequent robotic load handling device to retrieve the target storage container. The operational time to 'dig' a target storage container from a stack can represent a significant portion of the time to process the target storage container, which would involve moving the target storage container to an inventory handling station assembly and then returning the target storage container to the grid framework structure. The target storage container can be returned to its original location in a storage column or repositioned to a new location or new storage column.

Figure 18:
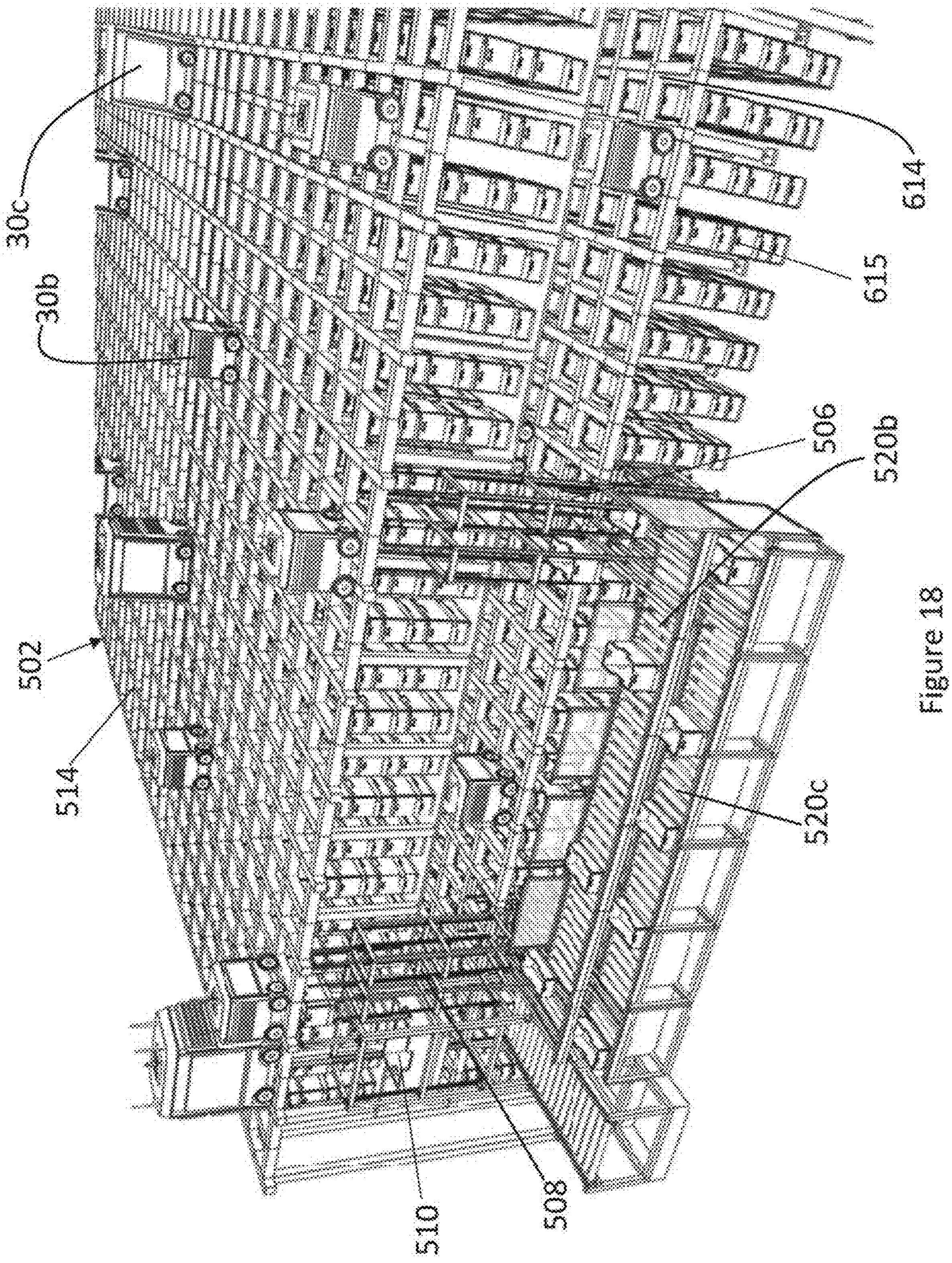
FIG. 18 is a schematic representation of the storage and retrieval system showing the different types of robotic load handling devices operable on the track system and transferring storage containers through respective upper level and lower level port columns to the inventory handling station assembly.

To overcome or reduce the problem of "digging", the grid framework structure according to the present invention comprises a second track system 614 as shown in FIGS. 18 and 19; the track system being the first track system 514. Like the first track system 514 discussed above, the second track system 614 comprises a first set of parallel tracks extending in a first direction and a second set of parallel tracks extending in a second direction, the second direction being substantially perpendicular to the first direction so creating a grid pattern for one or more robotic load handling devices to move one or more storage containers on the second track system. The second track system 614 is supported by a plurality of upright columns or upright members to form a second plurality of storage columns 615 for one or more storage containers to be stacked between and be guided by the upright columns. The plurality of storage columns below the first track system 514 discussed above in FIG. 12 are termed the first plurality of storage columns 212, 215. The storage containers can be arranged in the first and second plurality of storage columns in the grid framework structure such that storage containers that are frequently requested due to the high demand of items within the storage containers can be located in the second plurality of storage columns 615 below the second track system. This allows storage containers that are frequently requested to be retrieved by a robotic load handling device operative on the second track system 614. Equally plausible in the present invention is that the second plurality of storage columns 615 below the second track system 614 can be used to store the less frequently requested storage containers and the frequently requested storage containers are stored in the first plurality of storage columns 212, 215 below the first track system. The first and the second plurality of storage columns can comprise the first type storage columns 212 and/or the second type of storage columns 215 discussed above with reference to FIG. 12. One or more storage columns of the first and second plurality of storage columns are arranged so that they share the same or a common inventory handling station assembly 504. For this to be achievable, the first track system extends over the second track system such that a robotic load handling device operative on the first track system can port a storage container to the different levels of the inventory handling station assembly without affecting the ability for a robotic load handling device operative on the second track system to port a storage container to the different levels of the same inventory handling station assembly. Further details of the porting of the storage containers from the first and second track systems is discussed below.

In the particular embodiment shown in FIG. 18, the second track system 614 is at a different level to the first track system 514 in the sense is that it is at a different height, i.e. lower than the first track system. The storage volume below the second track system 614 has a lower storage capacity than the storage volume below the track system 514. More storage columns 615 and thus, storage containers can be accommodated below the track system 514 than below the second track system 614.

The portions of the grid framework structure comprising the first 212, 215 and the second 615 plurality of storage columns can optionally be designated to different temperature zones, e.g. ambient, chilled and/or frozen zones. For the purpose of the present invention, frozen temperature covers a range between substantially −25° C. to substantially 0° C., more preferably between substantially −21° C. to substantially −18° C.; the chilled temperature covers a range between substantially 0° C. to substantially 4° C., and the ambient controlled temperature coves a range between substantially 4° C. to substantially 21° C., preferably substantially 4° C. to substantially 18° C. The first plurality of storage columns can be designated for the storage of items that require a chilled environment and the second plurality of storage columns can be designated for the storage of items that require an ambient environment or vice versa. This is particularly important when fulfilling orders that are generally small comprising up to ten items, as is common in small convenience stores. Combining the chilled and the ambient zones into a single grid framework structure having a portion for the chilled zone and a portion for the ambient zone enables the grid framework structure to accommodate items necessary to fulfil such small orders.

One or more robotic load handling devices 30*b,c* operative on the second track system 614 can be controlled by the same or a separate controller instructing the robotic load handling devices on the first track system. One or more of the robotic load handling devices remotely operable on the first track system and second track system is configured to receive instructions from a master controller to a retrieve a storage container from a particular storage location within the grid framework structure. Wireless communications and networks may be used to provide the communication infrastructure from the master controller via one or more base stations to the one or more robotic load handling devices operative on the first and second track system. A controller in the robotic load handling device in response to receiving the instructions is configured to control various driving mechanisms to control the movement of the robotic load handling device. For example, the robotic load handling device may be instructed to retrieve a container from a storage column at a particular location on the first track system and/or second track system. The instruction can include various movements in an X-Y direction on the first track system and/or second track system. Once at the storage column, the lifting mechanism is then operated to grab the storage container and lift it into a container receiving space of the robotic load handling device where it is subsequently transported to a another location on the first track system and/or second track system commonly known as a drop-off port. The container is lowered to a suitable inventory handling station assembly to allow retrieval of the item from the storage container.

Like the first track system 514, the second track system 614 comprises a drop-off and/or pick-up port where the bots can drop off and/or pick up storage containers so that they can be transported to the inventory handling station assembly where the content of the storage containers can be accessed from outside of the grid framework structure. The columns extending below the drop-off and/or pick-up ports to the inventory handling device are termed the drop-off port column and the pick-up port column respectively. In addition to the upper port column and the lower port column for transferring storage containers between the first track system and the different levels of the inventory handling station assembly, the grid framework structure further comprises a second upper level port column extending between the second track system and the first access station at the first level, and a second lower level port column extending between the second track system and the second access station at the second level of the inventory handling station assembly. Like the upper level port column for transferring storage containers between the first track system 514 and the drop-off/pick-up areas at the first level, and the lower level port column for transferring storage containers between the first track system 514 and the drop-off/pick-up areas at the second level, the second upper level port column is configured for transferring storage containers between the second track system 614 and the drop-off/pick-up areas of the first access station at the first level, and the second lower level port column is configured for transferring storage containers between the second track system 614 and the drop-off/pick-up areas of the first access station at the second level. Again, the second upper and lower port columns can each be a single port column for dropping off and picking up storage containers to the respective drop-off and pick-up areas at the different first and second levels on the inventory handling station assembly. In other words, a single second upper level port column may be provided, through which storage containers are dropped off and picked up at the drop-off and pick-up areas of the first access station at the first level. Similarly, a single second lower level port column may be provided, through which storage containers are dropped off and picked up at the drop-off and pick-up areas of the second access station at the second level. In the particular embodiment shown in FIGS. 18 to 20, the second upper level port column comprises separate drop-off and pick-up port columns through which storage containers are transferred to the drop-off area and the pick-up area respectively at the first level. Similarly, the second lower level port column comprises separate drop-off and pick-up port columns through which storage containers are transferred between the drop-off area and the pick-up area respectively at the second level.

The conveyor system 522*b,c* at the different levels of the inventory handling system assembly, namely the entry conveyor unit and the exit conveyor unit at the first and second level, extends into the grid framework structure sufficiently for the second upper level port column and the second lower level port column below the second track system 614 to drop-off and/or pick-up storage containers to their respective conveyor systems at the different levels. The entry conveyor unit and the exit conveyor unit at the first and second level of the inventory handling station assembly extend into the grid framework structure such that the entry conveyor unit at the first level extends into the first and second upper level port columns below the first track system 514 and the second track system 614. This enables one or more robotic load handling devices operative on the first track system 514 and the second track system 614 to drop off storage containers to the entry conveyor unit at the first and second levels for transport to their respective access stations of the inventory handling station assembly. Similarly, one or more robotic load handling devices operative on the first track system 514 and the second track system 614 are able to pick up storage containers on the exit conveyor unit at the first and second levels of the inventory handling station assembly.

FIG. 19 is a frontal view of an example of the arrangement of the first track system 514 and the second track system 614 at the different levels to port into the access stations at the first and second levels via their respective entry conveyor units. The first track system at the upper level is shown porting to the entry conveyor units at the first and second levels. The entry conveyor unit at the second ‘lower’ level extends into the grid framework structure so as to enable a bot on the first track system 514 to port into the entry conveyor unit at the second ‘lower’ level. Similarly, the entry conveyor unit at the first ‘upper’ level extends into the framework structure so as to enable a bot on the second track system 614 to port into the entry conveyor unit at the first ‘upper’ level. The same principle applies to the exit conveyor units at the first ‘upper’ level and the second ‘lower’ level where storage containers waiting at the exit conveyor units are being lifted to the first track system 514 and the second track system 614.

Figure 20:
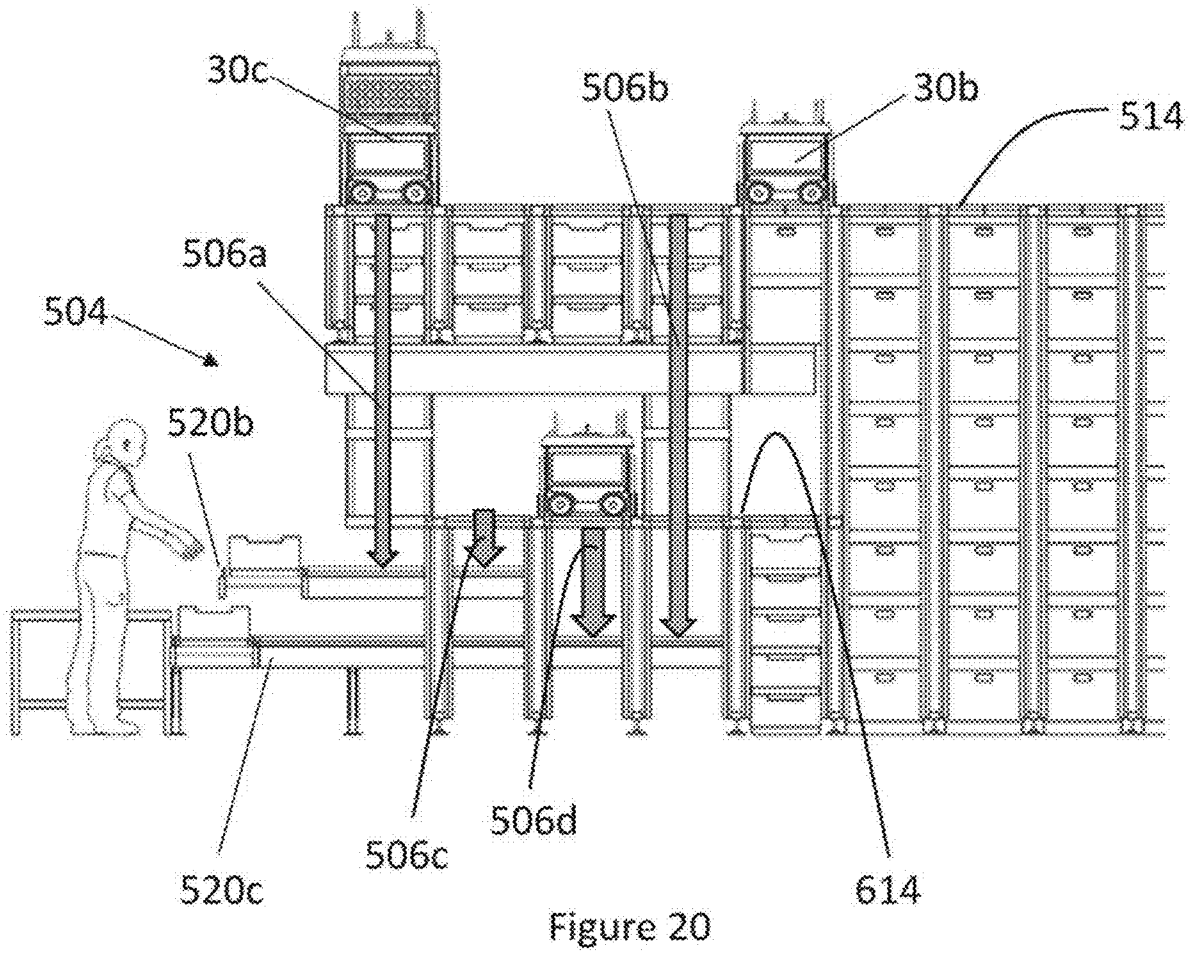
FIG. 20 is a side view of a section of the storage and retrieval system of FIG. 19 showing the arrangement of upper and lower level port columns through which storage containers are transferred between the first and second portions of the track system to the access stations at the different levels.

For the first track system to port into the access stations at the different first and second levels, at least a portion of the first track system is shown in FIG. 19 overhangs the second track system so as to allow one or more of the grid cells of the first track system to function as a drop-off and pick-up port for a bot (robotic load handling device) operative on the first track system to transfer a storage container between the first track system and the inventory handling station assembly. In this way, both the first track system and the second track system are able to port storage containers to the access stations at the different levels of the inventory handling station assembly. FIG. 20 shows a schematic side view of the storage and retrieval system according to the present invention at the drop-off area end of the inventory handling station assembly. The different port columns from the first and second track systems 514, 614 to the drop stations at the different levels of the inventory handling station assembly are labelled in FIG. 20 as 506*a*, 506*b*, 506*c*, 506*d*. The first track system 514 ports to the drop-off area at the first and second level of the inventory handling station assembly through the drop-off port columns 506*a* and 506*b* respectively. The second track system 614 ports to the drop-off area at the first and the second level of the inventory handling station assembly through the drop-off port columns 506*c* and 506*d* respectively. For ease of explanation and to differentiate from the first and second drop-off port columns 506*a*, 506*b* of the first track system, the drop-off port columns 506*c* and 506*d* of the second track system can be termed a first and second drop-off port columns of the second track system.

For a robotic load handling device operational on the first track system 514 to port one or more storage container to the inventory handling station assembly below, in one example of the present invention shown in FIG. 20, the first (upper level) 506*a* and/or second (lower level) 506*b* drop-off port columns of the first track system can extend through one or more grid cells in the second track system 614. For example, the first drop-off port column 506*a* can extend through a grid cell in the second track system 614 to first access station 520*b* of the inventory handling station assembly below and/or the second drop-off port column 506*b* can extend through a separate grid cell in the second track system 614 to the second access station 520*c* of the inventory handling station assembly. It is not necessary that the first drop-off port column 506*a* of the first track system extends through a grid cell in the second track system in order to port a storage container to the first access station 520*b* at the upper level of the inventory handling station assembly. Overhanging at least a portion of the first track system 514 over the second track system 614 such that the overhang extends sufficiently past the edge of the second track system allows the first drop-off port column 506*a* extends directly onto the first access station 520*b* of the inventory handling station assembly without the need to extend into a grid cell of the second track system. However, the overhanging of the first track system 514 may not be sufficiently long enough for a robotic load handling device on the first track system to port a storage container directly to the second (lower) access station 520*c* via the second drop-off port column 506*b* without porting through a grid cell of the second track system 614 as demonstrated in FIG. 20, i.e. the second drop-off port column 506*b* may need to extend through a grid cell of the second track system 614. In this case, a robotic load handling device operable on the first track system can port a storage container to the lower second access station via the second drop-off port column 506*b* extending through a grid cell in the second track system.

The same principle applies when transferring storage containers from the pick-up area at the first level and the second level towards the first 514 and second 614 track system via respective pick-up port columns. In this way, the first and second track systems and their respective first and drop-off and pick-up port columns share a common inventory handling station assembly. The entry conveyor unit at the drop-off area 516*b* at the lower second level of the inventory handling station assembly is not only set back from the first level to receive storage containers from the first track system, the entry conveyor units at the drop-off areas 516*a,b* at the first level and second level are laterally displaced such that the upper level portal column extending from the first track system to the drop-off and/or pick-up areas do not obstruct movement of the bot (robotic load handling device) on the second track system. In this way, storage containers lowered onto either the entry conveyor units at the first 'upper' level and second 'lower' level can be conveyed to their respective access stations at the different levels where they are paused for one or more items to be picked from the storage containers, before being conveyed to their respective exit conveyor units. Similarly, the exit conveyor units at the pick-off areas 518*a,b* at the first level and second level are laterally displaced such that the upper level portal column extending from the first track system to the drop-off and/or pick-up areas do not obstruct movement of the bot (robotic load handling device) on the second track system. In the particular embodiment shown in FIG. 17, the length of the access conveyor unit at the first level of the inventory handling station assembly is longer than the access conveyor unit at the second level so as to enable their respective entry and exit conveyor units to be laterally displaced. The displacement of the conveyor systems 522*b*, 522*c* at the first and second levels of the access station allows a robotic load handling device operative on the first track system to port one or more storage containers to the first and second access stations of the inventory handling station assembly and a robotic load handling device operative on the second tack system to port one or more storage containers to the first and second access stations of the same inventory handling station assembly.

The direction of travel from the drop-off area to the pick-up area via the access station at each of the first and second level is shown to adopt a substantially 'U' shaped trajectory where the storage containers are conveyed into and out of the access station in a first and a third transport direction that are equal and opposite. The storage containers are conveyed in a second transport direction along the access station; the second transport direction being substantially perpendicular to the first and third transport direction such that the storage containers change direction twice when travelling from the drop-off area to the pick-up area via the access station. However, other trajectory shapes of the storage containers from the drop-off area to the pick-up area via the access station are applicable in the present invention, so as to enable storage containers to be transferred between the upper level first track system and the lower level second track system and the different first and second levels of the access station.

Whilst, the preferred embodiments of the present invention have been described in detail above, however, it should be understood that various modifications of the storage container encompassing different features described above are applicable within the scope of the present invention as defined in the claims. For example, the size of the grid cell openings of the second track system can be similar to arrangements of the grid cell openings of the track system described with reference to FIG. 8 to 11 comprising a first portion comprising the small first type grid openings and a second portion comprising a combination of the small first type grid openings and the larger second type grid openings.

In this way, the second plurality of storage columns below the second track system can accommodate the smaller first type storage containers and the larger second type storage containers. As a result, the small first type robotic load handling device and the larger second type robotic load handling devices can operate on the second track system. Alternatively, the size of the grid cell openings of the first and second track system in the embodiment of the present invention shown in FIGS. 16 to 20 can be uniform in sense of accommodating one size storage container.

The invention claimed is:

1. A storage and retrieval system comprising:

A) a grid framework structure including:

i) a plurality of storage columns configured for one or more storage containers to be stored in vertical stacks, ii) a track system arranged above the plurality of storage columns, the track system including a plurality of tracks arranged in a grid pattern extending in a substantially horizontal plane and including a plurality of grid cells or grid spaces configured and arranged through which storage containers in a stack are transferrable between the plurality of storage columns and a top level of the track system;

B) an inventory handling station assembly including a first access station at a first level and a second access station at a second level, the first level being vertically spaced from the second level, for gaining access to contents of storage containers at the first and second access stations at the first and second levels, respectively, wherein the first level of the inventory handling station assembly includes a drop-off area and a pick-up area arranged below the upper level port column for transferring storage containers between the track system and the drop-off area and the pick-up area at the first level, and wherein the second level of the inventory handling station assembly includes a drop-off area and a pick-up area arranged below the lower level port column for transferring storage containers between the track system and the drop-off and the pick-up area at the second level;

C) an upper level port column extending from the track system to the first access station at the first level for transferring storage containers between the track system and the inventory handling station assembly; and D) a lower level port column extending from the track system to the second access station at the second level for transferring storage containers between the track system and the inventory handling station assembly;

wherein the upper level port column comprises a drop-off port column extending from the track system to the drop-off area at the first level and a separate pick-up port column extending from the track system to the pick-up area at the first level; the lower level port column comprises a drop-off port column extending from the track system to the drop-off area at the second level and a separate pick-up port column extending from the track system to the pick-up area at the second level; the first level comprises a first conveyor system configured to convey one or more storage containers from the drop-off area at the first level to the pick-up area at the first level via the first access station; and the second level comprises a second conveyor system configured to convey one or more storage containers from the drop-off area at the second level to the pick-up area at the second level via the second access station.

2. The storage and retrieval system of claim 1, wherein the first access station is laterally offset from the second access station.

3. The storage and retrieval system of claim 1, wherein the first access station at least partially overlays the second access station.

4. The storage and retrieval system of claim 1, wherein the drop-off and pick-up areas at the first level are laterally offset from respective drop-off and pick-up areas at the second level such that the drop-off and pick-up areas at each of the first and second level are arranged below their respective upper level port column and lower level port columns.

5. The storage and retrieval system of claim 1, wherein each of the first and second conveyor systems comprises:

an entry conveyor unit, an exit conveyor unit, and at least one access conveyor unit, wherein:

the entry conveyor unit is arranged in the drop-off area and is configured and arranged to transport a storage container in a first transport direction from the drop-off area to the first or second access station;

the exit conveyor unit is arranged in the pick-up area and is configured and arranged to transport a storage container from the at least one access conveyor unit to the pick-up area in a second transport direction; and the at least one access conveyor unit is configured and arranged to transport a storage container from the drop-off area to the pick-up area via a respective first or second access station in a third transport direction.

6. The storage and retrieval system of claim 5, wherein the entry conveyor unit and the exit conveyor unit are arranged such that the first transport direction of the entry conveyor unit is opposite and parallel to the second transport direction of the exit conveyor unit; and wherein the third transport direction of the at least one access conveyor unit is substantially orthogonal to both the first transport direction of the entry conveyor unit and the second transport direction of the exit conveyor unit.

7. The storage and retrieval system of claim 5, wherein the conveyor system is configured and arranged such that the first transport direction of the entry conveyor unit is substantially orthogonal to both the second transport direction of the exit conveyor unit and the third transport direction of the at least one access conveyor unit.

8. The storage and retrieval system of claim 1, wherein the grid framework structure comprises:

a first plurality of upright columns arranged to form the plurality of storage columns for one or more of the storage containers to be stacked between and be guided by the plurality of upright columns in a vertical direction.

9. A storage and retrieval system comprising:

A) a grid framework structure including:

i) a plurality of storage columns configured for one or more storage containers to be stored in vertical stacks, ii) a track system arranged above the plurality of storage columns, the track system including a plurality of tracks arranged in a grid pattern extending in a substantially horizontal plane and including a plurality of grid cells or grid spaces configured and arranged through which storage containers in a stack are transferrable between the plurality of storage columns and a top level of the track system;

B) an inventory handling station assembly including a first access station at a first level and a second access station at a second level, the first level being vertically spaced from the second level, for gaining access to contents of storage containers at the first and second access stations at the first and second levels, respectively;

C) an upper level port column extending from the track system to the first access station at the first level for transferring storage containers between the track system and the inventory handling station assembly; and D) a lower level port column extending from the track system to the second access station at the second level for transferring storage containers between the track system and the inventory handling station assembly;

wherein the grid framework structure comprises:

i) a second plurality of storage columns for one or more storage containers to be stored in vertical stacks;

ii) a second track system arranged above the second plurality of storage columns, the second track system including a plurality of tracks arranged in a grid pattern extending in a substantially horizontal plane and including a plurality of grid cells or grid spaces configured and arranged through which storage containers in a stack are transferrable between the second plurality of storage columns and a top level of the second track system, wherein the second track system is vertically spaced from the track system such that the track system and the second track system share a same inventory handling station assembly;

iii) a second upper level port column extending from the second track system to the first access station at the first level for transferring storage containers between the second track system and the inventory handling station assembly; and iv) a second lower level port column extending from the second track system to the second access station at the second level for transferring storage containers between the second track system and the inventory handling station assembly.

10. The storage and retrieval system of claim 9, wherein the grid framework structure comprises:

a second plurality of upright columns arranged to form the second plurality of storage columns for one or more of the storage containers to be stacked between and be guided by the plurality of upright columns in a vertical direction.

11. The storage and retrieval system of claim 9, wherein the track system is above the second track system.

12. The storage and retrieval system of claim 9, wherein at least a portion of the track system overhangs the second track system so as to enable a robotic load handling device operative on the overhang to port a storage container to the inventory handling station assembly.

13. The storage and retrieval system of claim 12, wherein the at least portion of the track system overhanging the second track system comprises:

the upper level port column for transferring storage containers between the track system and the first access station of the inventory handling station assembly and/or the second lower level port column for transferring storage containers between the track system and the second access station of the inventory handling station assembly.

14. The storage and retrieval system of claim 9, wherein the track system and/or second track system comprises:

i) a small cell portion including a first set of grid cells, and ii) a large cell portion comprising a second set of grid cells, wherein at least one dimension of each grid cell of the second set of grid cells is a multiple of at least one dimension of each grid cell of the first set of grid cells.

15. The storage and retrieval system of claim 14, wherein the second track system comprise: the first set of grid cells.

16. The storage and retrieval system of claim 14, wherein:— i) the first set of grid cells includes a first set of parallel tracks extending in a first direction and a second and a third set of parallel tracks extending in a second direction, the second direction being substantially perpendicular to the first direction, the first, second and third sets of parallel tracks being arranged in the grid pattern, each grid cell of the first set of grid cells having a dimension extending in the first direction and a dimension extending in the second direction to define a first type grid cell opening; and ii) the second set of grid cells includes the first and second sets of parallel tracks, each grid cell of the second set of grid cells having a dimension extending in the first direction and a dimension extending in the second direction to define a second type grid cell opening; and wherein in the first direction, the dimension of the second type grid cell opening is a multiple of the dimension of the first type grid cell opening, and in the second direction, the dimension of the first type grid cell opening is substantially equal to the dimension of the second type grid cell opening.

17. The storage and retrieval system of claim 14, comprising:

i) a first type robotic load handling device including a first vehicle wheel assembly including a first set of wheels having a first track width and a second set of wheels having a second track width;

ii) a second type robotic load handling device operable on the track system, said second type robotic load handling device including a second vehicle wheel assembly including a first set of wheels having a first track width and a second set of wheels having a second track width, wherein the first track width of the first vehicle wheel assembly is substantially equal to the first track width of the second vehicle wheel assembly, and the second track width of the second vehicle wheel assembly is a multiple of the second track width of the first vehicle wheel assembly such that the first type robotic load handling device is configured to move in both the first and second directions on the first set of grid cells and the second type robotic load handling device is configured to move in both the first and second direction on the second set of grid cells; and wherein the first type robotic load handling device and/or second type robotic load handling device is/are operable on the track system and/or second track system.

* * * * *